(12) United States Patent
Geertsema et al.

(10) Patent No.: US 11,588,664 B2
(45) Date of Patent: *Feb. 21, 2023

(54) SYSTEMS AND METHODS FOR DATA MESSAGE DECODING AND ASSET TYPE FINGERPRINTING

(71) Applicant: Geotab Inc., Oakville (CA)

(72) Inventors: Kenneth James Hendrik Geertsema, Kitchener (CA); Paul Philip Ciolek, Oakville (CA); Michael Giannikouris, Kitchener (CA); Alexander K. Koch, Guelph (CA); Ryan Andrew MacDonald, Waterloo (CA)

(73) Assignee: Geotab Inc., Oakville (CA)

( * ) Notice: Subject to any disclaimer, the term of this patent is extended or adjusted under 35 U.S.C. 154(b) by 117 days.

This patent is subject to a terminal disclaimer.

(21) Appl. No.: 17/212,224

(22) Filed: Mar. 25, 2021

(65) Prior Publication Data
US 2022/0311640 A1 Sep. 29, 2022

Related U.S. Application Data

(60) Provisional application No. 63/164,740, filed on Mar. 23, 2021.

(51) Int. Cl.
*H04L 12/40* (2006.01)
*H04L 29/08* (2006.01)
*H04L 67/12* (2022.01)

(52) U.S. Cl.
CPC .. *H04L 12/40071* (2013.01); *H04L 12/40013* (2013.01); *H04L 12/40104* (2013.01);
(Continued)

(58) Field of Classification Search
CPC ......... H04L 12/40071; H04L 12/40013; H04L 12/40104; H04L 67/12
See application file for complete search history.

(56) References Cited

U.S. PATENT DOCUMENTS 7,493,388 B2   2/2009   Wen et al.
7,624,435 B1   11/2009  Huang
(Continued)

OTHER PUBLICATIONS

EP22161245.0, Jul. 22, 2022, Extended European Search Report.
(Continued)

*Primary Examiner* — Rasheed Gidado
(74) *Attorney, Agent, or Firm* — Wolf, Greenfield & Sacks, P.C.

(57) ABSTRACT

A method for an asset tracking system is provided. An example method includes receiving data messages from an asset coupled to the asset tracking system and attempting to obtain asset information from data messages with reference to a local set of signal definitions indicating how data messages received from the asset are to be decoded into asset information. Upon failing to obtain the asset information the asset tracking system requests from an asset data analysis system the generation of a generated signal definition indicating how the data message of the outstanding type is to be obtained from the asset. The asset tracking system provides access to at least one undecoded data message of the outstanding data type to the asset data analysis system, receives the generated signal definition from the asset data analysis system, and adds the generated signal definition to the local set of signal definitions.

20 Claims, 17 Drawing Sheets

(52) U.S. Cl.
CPC .... *H04L 67/12* (2013.01); *H04L 2012/40215* (2013.01); *H04L 2012/40273* (2013.01)

(56) References Cited

U.S. PATENT DOCUMENTS

| | | | |
|---|---|---|---|
| 8,909,924 | B2 | 12/2014 | Lord et al. |
| 9,058,329 | B1 | 6/2015 | Rosenstein et al. |
| 10,750,336 | B2 | 8/2020 | Mendes et al. |
| 11,321,399 | B1 | 5/2022 | Geertsema et al. |
| 11,368,825 | B2 | 6/2022 | Mendes et al. |
| 2007/0133455 | A1* | 6/2007 | Kuchibhotla ......... H04W 76/14 370/312 |
| 2011/0148657 | A1* | 6/2011 | Mackenzie ........ G06Q 30/0201 705/7.29 |
| 2012/0278479 | A1* | 11/2012 | Miller ................ G06Q 10/087 709/224 |
| 2016/0366178 | A1 | 12/2016 | Wesie et al. |
| 2016/0380867 | A1 | 12/2016 | Scarabeo et al. |
| 2017/0230790 | A1 | 8/2017 | Skomra et al. |
| 2018/0174057 | A1* | 6/2018 | Citriniti ................. G06Q 10/04 |
| 2018/0247262 | A1 | 8/2018 | Arena |
| 2019/0018751 | A1 | 1/2019 | Davidi |
| 2019/0019090 | A1 | 1/2019 | Chacko et al. |
| 2020/0015048 | A1* | 1/2020 | Mendes ................. H04W 4/38 |
| 2020/0065760 | A1* | 2/2020 | Ayoub .............. G06Q 10/0835 |
| 2020/0125470 | A1 | 4/2020 | Cui et al. |
| 2020/0351629 | A1 | 11/2020 | Mendes et al. |
| 2021/0037358 | A1 | 2/2021 | Mendes et al. |
| 2021/0233094 | A1* | 7/2021 | Isaacs ................. G06F 3/04847 |
| 2022/0311639 | A1 | 9/2022 | Geertsema et al. |

OTHER PUBLICATIONS

EP22161438.1, Jul. 25, 2022, Extended European Search Report.
EP22161826.7, Jul. 22, 2022, Extended European Search Report.
EP22162389.5, Jul. 25, 2022, Extended European Search Report.
EP22160462.2, Jul. 25, 2022, Extended European Search Report.
Extended European Search Report for European Application No. 22161245.0, dated Jul. 22, 2022.
Extended European Search Report for European Application No. 22161438.1, dated Jul. 25, 2022.
Extended European Search Report for European Application No. 22161826.7, dated Jul. 22, 2022.
Extended European Search Report for European Application No. 22162389.5, dated Jul. 25, 2022.
Extended European Search Report for European Application No. 22160462.2, dated Jul. 25, 2022.
Young et al., Towards reverse engineering controller area network messages using machine learning. 2020 IEEE 6th World Forum on Internet of Things (WF-IoT). Jun. 2, 2020:1-6.
Geertsema et al., Systems and Methods for Asset Type Fingerprinting and Data Message Decoding. Co-pending U.S. Appl. No. 17/554,094, filed Dec. 17, 2021.
[No Author Listed] Telematics. Wikipedia. https://en.wikipedia.org/wiki/Telematics. Last Accessed Feb. 23, 2022:1-8.
Cho et al., Fingerprinting electronic control units for vehicle intrusion detection. 25th USENIX Security Symposium (USENIX Security 16). Aug. 10-12, 2016:911-27.
Hermans et al., Decoding of data on a can powertrain network. 16th Annual Symposium on Communication and Vehicular Technology in the Benelux.2009;1(6):1-6.
Huybrechts et al., Automatic Reverse Engineering of CAN Bus Data Using Machine Learning Techniques. Advances on P2P, Parallel, Grid, Cloud and Internet Computing. Lecture Notes on Data Engineering and Communications Technologies. Springer, Cham. 2018;13:751-61. https://doi.org/10.1007/978-3-319-69835-9_71.
Young, Techniques for utilizing classification towards securing automotive controller area network and machine learning towards the reverse engineering of CAN messages. Doctoral Dissertation, Iowa State University. 2020:1-120.
U.S. Appl. No. 16/928,335, filed Jul. 14, 2020, Mendes et al.
U.S. Appl. No. 17/074,512, filed Oct. 19, 2020, Mendes et al.
U.S. Appl. No. 17/212,162, filed Mar. 25, 2021, Geertsema et al.
U.S. Appl. No. 17/554,094, filed Dec. 17, 2021, Geertsema et al.
Mendes et al., System and method for managing a fleet of vehicles including electric vehicles. Co-pending U.S. Appl. No. 16/928,335, filed Jul. 14, 2020.
Mendes et al., System and method for managing a fleet of vehicles including electric vehicles. Co-pending U.S. Appl. No. 17/074,512, filed Oct. 19, 2020.
Geertsema et al., Systems and methods for asset type fingerprinting and data message decoding. Co-pending U.S. Appl. No. 17/212,162, filed Mar. 25, 2021.
Mendes et al., System and method for managing a fleet of vehicles including electric vehicles. Co-pending U.S. Appl. No. 17/829,443, filed Jun. 1, 2022.

* cited by examiner

SYSTEMS AND METHODS FOR DATA MESSAGE DECODING AND ASSET TYPE FINGERPRINTING

RELATED APPLICATIONS

This application claims the benefit under 35 U.S.C. § 119(e) to U.S. Provisional Application Ser. No. 63/164,740, filed Mar. 23, 2021, and entitled "SYSTEMS AND METHODS FOR ASSET TYPE FINGERPRINTING AND DATA MESSAGE DECODING" which is herein incorporated by reference in its entirety.

FIELD

The present disclosure relates to telematics, and in particular to the collection of data from assets by asset tracking systems.

BACKGROUND

In the field of telematics, the location of an asset and other data pertaining to the asset may be monitored by an asset tracking system in the form of a device placed onboard the asset or a system integrated within the asset itself. The location of the asset may be tracked through the use of a satellite navigation system, such as a Global Positioning System (GPS), Global Navigation Satellite System (GNSS), cellular tower network, or other system. Other data may be collected through sensors (e.g., accelerometers, temperature sensors), or by decoding data messages received from Electronic Control Units (ECUs) of the asset. In cases where the asset being tracked is a vehicle, a variety of vehicle information may be obtained from such ECUs, such as engine speed, battery temperature, fuel level, tire pressure, odometer reading, and other data. Such data may be made available over a Controller Area Network (CAN), through a communication port (e.g., an OBD2 port), and/or by direct connection to systems onboard the asset. In any case, such data may be transmitted to, and recorded at, an asset data analysis system to be used in the provision of a telematics service, such as a fleet management tool, or for analysis.

SUMMARY

According to an aspect of the disclosure, an example asset tracking system is provided. The system includes an asset interface to receive data messages from an asset, a network interface to communicate with an asset data analysis system, and one or more processors operatively coupled to the asset interface and the network interface to request an asset type fingerprint for the asset from the asset data analysis system, provide access to data messages received from the asset to the asset data analysis system, receive a determined asset type fingerprint from the asset data analysis system generated based on the data messages provided, obtain asset information from the asset by decoding data messages received from the asset with reference to a specified set of signal definitions in a local set of signal definitions, wherein the specified set of signal definitions is associated with the determined asset type fingerprint and indicates how data messages are to be decoded from an asset of the determined asset type fingerprint. The asset may include a vehicle, and the data messages comprise Controller Area Network (CAN) messages. The asset tracking system may include memory to maintain a local set of signal definitions that contains a preliminary set of signal definitions that indicates how data messages from known asset types are to be decoded into asset information, and in response to receiving the determined asset type fingerprint, the one or more processors may reference a specified set of signal definitions in the local set of signal definitions to decode data messages received from the asset into asset information. The one or more processors may receive one or more new signal definitions associated with the determined asset type fingerprint, and add the one or more new signal definitions to the local set of signal definitions, wherein the one or more new signal definitions are included in the specified set of signal definitions. The one or more processors may cause the network interface to transmit, to the asset data analysis system, the asset information obtained from the asset.

According to another aspect of the disclosure, an example asset data analysis system is provided. The system includes a network interface to communicate with an asset tracking system located at an asset, one or more processors operatively coupled to the network interface to receive a request for an asset type fingerprint for the asset from the asset tracking system, access data messages received from the asset by the asset tracking system, attempt to match the data messages to a known asset type fingerprint, and upon failure to match the data messages to a known asset type fingerprint, generate a proposed asset type fingerprint that uniquely identifies the asset apart from known asset type fingerprints based on unique criteria identified in the data messages, link the proposed asset type fingerprint to a specified set of signal definitions that indicates how data messages from the asset of the proposed asset type fingerprint are to be decoded, transmit the proposed asset type fingerprint to the asset tracking system, wherein receipt of the proposed asset type fingerprint by the asset tracking system causes the asset tracking system to use the specified set of signal definitions to obtain asset information from the asset.

The unique criteria identified in the data messages may include message protocol data that defines how the data messages are to be obtained from the asset. The unique criteria identified in the data messages may include identification of a particular signal characteristic found in data payloads of the data messages. Identification of the particular signal characteristic may include matching a signal feature in the data payloads of the data messages to a reference signal.

The asset data analysis system may include memory to maintain a repository of data messages originating from known asset types, and maintain a library of asset type fingerprints, an asset type fingerprint comprising criteria to determine whether a particular set of data messages originates from a particular asset type, each asset type fingerprint linked to a specified set of signal definitions that indicate how data messages from an asset of the linked asset type fingerprint are to be decoded. The one or more processors, upon failing to match the data messages to a known asset type fingerprint, and prior to transmitting the proposed asset type fingerprint to the asset tracking system, may determine whether the proposed asset type fingerprint conflicts with an existing asset type fingerprint stored in the library of asset type fingerprints or with the repository of data messages originating from known asset types, and upon determination that there is no conflict, enter the proposed asset type fingerprint into the library of asset type fingerprints. The one or more processors may transmit the proposed asset type fingerprint only upon determination that there is no conflict.

The asset may include a vehicle, and the data messages comprise Controller Area Network (CAN) messages. The asset tracking system may include memory to maintain a local set of signal definitions that contains a preliminary set of signal definitions that indicates how data messages from known asset types are to be decoded into asset information, and in response to receiving the determined asset type fingerprint, the one or more processors may reference a specified set of signal definitions in the local set of signal definitions to decode data messages received from the asset into asset information.

The asset tracking system may receive one or more new signal definitions associated with the determined asset type fingerprint, and add the one or more new signal definitions to the local set of signal definitions, wherein the one or more new signal definitions are included in the specified set of signal definitions. The asset tracking system may transmit, to the asset data analysis system, the asset information obtained from the asset.

According to yet another aspect of the disclosure, an example method for determining an asset type fingerprint of an asset is provided. The method involves receiving, at an asset tracking system located at an asset, data messages from the asset, attempting, at the asset tracking system, to identify an asset type fingerprint of the asset based on the data messages, upon succeeding to identify an asset type fingerprint of the asset, configuring the asset tracking system to obtain asset information from the asset by decoding data messages received from the asset with reference to a local set of signal definitions associated with the identified asset type fingerprint, and upon failing to identify an asset type fingerprint: requesting, from the asset tracking system to an asset data analysis system, an asset type fingerprint for the asset, providing access, via the asset tracking system, to data messages received from the asset to the asset data analysis system, generating, at the asset data analysis system, a proposed asset type fingerprint that uniquely identifies the asset among known asset type fingerprints based on unique criteria identified in the data messages received from the asset, and linking the proposed asset type fingerprint to a specified set of signal definitions that indicates how data messages of different data types are to be decoded from an asset of the proposed asset type fingerprint, and configuring the asset tracking system to obtain asset information from the asset by decoding data messages received from the asset with reference to a specified set of signal definitions in a local set of signal definitions.

The method may involve the asset data analysis system maintaining a repository of data messages originating from known asset types, the asset data analysis system maintaining a library of asset type fingerprints, an asset type fingerprint comprising criteria to determine whether a particular set of data messages originates from a particular asset type, each asset type fingerprint linked to a specified set of signal definitions that indicate how data messages from an asset of the linked asset type fingerprint are to be decoded into asset information, the asset data analysis system, upon failing to match the data messages to a known asset type fingerprint, and prior to transmitting the proposed asset type fingerprint to the asset tracking system, determining whether the proposed asset type fingerprint conflicts with an existing asset type fingerprint stored in the library of asset type fingerprints or with the repository of data messages originating from known asset types, and upon determining that there is no conflict, entering the proposed asset type fingerprint into the library of asset type fingerprints, wherein the asset data analysis system only transmits the proposed asset type fingerprint only upon determination that there is no conflict.

The asset may include a vehicle, and the data messages may includeController Area Network (CAN) messages.

The method may involve the asset tracking system maintaining a local set of signal definitions that contains a preliminary set of signal definitions that indicates how data messages from known asset types are to be decoded into asset information, and the asset tracking system, in response to receiving the determined asset type fingerprint, updating the local set of signal definitions to indicate how data messages from the asset are to be decoded into asset information.

The method may involve the asset tracking system receiving one or more new signal definitions associated with the determined asset type fingerprint, and adding the one or more new signal definitions to the local set of signal definitions, wherein the one or more new signal definitions are included in the specified set of signal definitions.

The method may involve the asset tracking system transmitting, to the asset data analysis system, the asset information obtained from the asset. The unique criteria identified in the data messages may include message protocol data that defines how the data messages are to be obtained from the asset. The unique criteria identified in the data messages may include identification of a particular signal characteristic found in data payloads of the data messages. Identification of the particular signal characteristic may involve matching a signal feature in the data payloads of the data messages to a reference signal.

According to yet another aspect of the disclosure, another example asset tracking system is provided. The system includes an asset interface to receive data messages from an asset, a network interface to communicate with an asset data analysis system, memory to maintain a local set of signal definitions that indicates how data messages received from the asset are to be decoded into asset information, one or more processors operatively coupled to the asset interface and the network interface to:attempt to obtain asset information from the data messages received from the asset with reference to the local set of signal definitions, and upon failure to obtain data of an outstanding data type from the asset: request that the asset data analysis system generate a new signal definition that indicates how data of the outstanding data type is to be obtained from the asset, provide access to undecoded data messages received from the asset to the asset data analysis system, receive the new signal definition generated based on the provided undecoded data messages, and add the new signal definition to the local set of signal definitions.

The outstanding data type may be a requestable data type, and the new signal definition may indicate how a data message of the outstanding data type is to be solicited from the asset via a request. The outstanding data type may be a broadcasted data type, and data messages of the outstanding data type may be included in the undecoded data messages to which access is provided to the asset data analysis system.

The asset may include a vehicle, and the data messages comprise Controller Area Network (CAN) messages.The one or more processors may cause the network interface to transmit, to the asset data analysis system, the asset information obtained from the asset.

According to yet another aspect of the disclosure, another example asset data analysis system is provided. The system includes memory to maintain a library of signal definitions that contains specified sets of signal definitions, wherein each specified set of signal definitions indicates how data messages received from a specified asset type are to be decoded into asset information, a network interface to communicate with an asset tracking system located at an asset, one or more processors operatively coupled to the memory and the network interface to: receive a request for a new signal definition from the asset tracking system, access undecoded data messages received from the asset by the asset tracking system, attempt to match an undecoded data signal constructed from the undecoded data messages to a reference signal constructed from data messages of a data message type for which there is an existing signal definition in the library of signal definitions, and in response to a successful match, generate a new signal definition that indicates how a data message having a format of the undecoded data messages is to be decoded into asset information, and transmit the new signal definition to the asset tracking system.

The one or more processors may, in response to a successful match: link the new signal definition to an asset type fingerprint in a library of asset type fingerprints.

The memory may be to maintain a repository of data messages mapped to known data types and asset information derived therefrom for a plurality of known asset types, the one or more processors may be to train a machine learning model on the repository of data messages to recognize signal features in data signals constructed from data messages of unknown data types that indicate the data type of those data messages, and the one or more processors may be to attempt to match the undecoded data signal to a reference signal by applying the machine learning model to the undecoded data signal.

Prior to the one or more processors attempting to match the undecoded data signal to a reference signal, the one or more processors may determine payload identification instructions to locate a data payload in the data message format of the undecoded data messages.

The reference signal may be constructed from the same underlying data as the undecoded data signal, and the one or more processors may be to attempt to match the undecoded data signal to the reference signal at least in part by attempting to match one or more points in the undecoded data signal to one or more corresponding points in the reference signal.

The one or more processors may be to generate the new signal definition at least in part by determining payload conversion instructions to convert the data payload into asset information, and the determination of payload conversion instructions may involve determining one or more of a scaling factor and data offset to be applied to the undecoded data signal to match one or more points in the undecoded data signal to one or more corresponding points in the reference signal.

The reference signal may be constructed from different underlying data as the undecoded data signal, and the one or more processors may attempt to match the undecoded data signal to the reference signal at least in part by attempting to match one or more signal features in the undecoded data signal to one or more corresponding signal features in the reference signal.

The one or more processors may be to generate the new signal definition at least in part by determining payload conversion instructions to convert the data payload into asset information, and the determination of payload conversion instructions may involve determining one or more of a scaling factor and data offset to be applied to the undecoded data signal to match one or more points in the undecoded data signal to one or more corresponding reference points collected in cooperation with a sensor at the asset.

The asset data analysis system may include a sensor located at the asset, and the one or more processors may attempt to match the undecoded data signal to the reference signal by attempting to correlate the undecoded data messages with sensor data gathered at the asset. The sensor located at the asset may include a camera to capture information displayed on an information display at the asset.

According to yet another aspect of the disclosure, an example method for generating a new signal definition to decode data collected from an asset is provided. The method involves receiving, at an asset tracking system located at an asset, data messages from the asset, maintaining, at the asset tracking system, a set of signal definitions that indicates how data messages of different data types received from different asset types are to be decoded into asset information, attempting, at the asset tracking system, to obtain asset information from the data messages received from the asset with reference to the set of signal definitions, and upon failure to obtain asset information of an outstanding data type from the asset: requesting, from the asset tracking system to an asset data analysis system, a new signal definition for obtaining the outstanding data type from the asset, providing access to undecoded data messages received from the asset to the asset data analysis system, attempting, at the asset data analysis system, to match an undecoded data signal, the undecoded data signal constructed from the undecoded data messages, to a reference signal, the reference signal constructed from data messages of a data message type for which there is an existing signal definition in a library of signal definitions, at the asset data analysis system, that indicates how a data message having a format of that data message type is to be decoded into asset information, in response to a successful match, generating, at the asset data analysis system, a new signal definition that indicates how a data message having a format of the undecoded data signal is to be decoded into asset information, and transmitting the new signal definition to the asset tracking system, receiving, at the asset tracking system, the new signal definition generated based on the provided undecoded data messages, and adding, at the asset tracking system, the new signal definition to the set of signal definitions.

The method may involve the asset data analysis system, in response to a successful match, linking the new signal definition to an asset type fingerprint in a library of asset type fingerprints. The method may involve maintaining, at the asset data analysis system, a repository of data messages mapped to known data types and asset information derived therefrom for a plurality of known asset types, and training, at the asset data analysis system, a machine learning model on the repository of data messages to recognize signal features in data signals constructed from data messages of unknown data types that indicate the data type of those data messages, wherein the asset data analysis system attempting to match the undecoded data signal to a reference signal comprises applying the machine learning model to the undecoded data signal.

The method may involve, prior to the asset data analysis system attempting to match the undecoded data signal to a reference signal, the asset data analysis system determining payload identification instructions to locate a data payload in the data message format of the undecoded data messages. The reference signal may be constructed from the same underlying data as the undecoded data signal, and the asset data analysis system attempting to match the undecoded data signal to the reference signal comprises attempting to match one or more points in the undecoded data signal to one or more corresponding points in the reference signal. The method may further involve the asset data analysis system generating the new signal definition comprises determining payload conversion instructions to convert the data payload into asset information, wherein the determination of payload conversion instructions involves determining one or more of a scaling factor and data offset to be applied to the undecoded data signal to match one or more points in the undecoded data signal to one or more corresponding points in the reference signal.

The reference signal may be constructed from different underlying data as the undecoded data signal, and the asset data analysis system attempting to match the undecoded data signal to the reference signal may involve attempting to match one or more signal features in the undecoded data signal to one or more corresponding signal features in the reference signal.

The asset data analysis system generating the new signal definition may involve determining payload conversion instructions to convert the data payload into asset information, wherein the determination of payload conversion instructions involves determining one or more of a scaling factor and data offset to be applied to the undecoded data signal to match one or more points in the undecoded data signal to one or more corresponding reference points collected in cooperation with a sensor at the asset.

The method may involve gathering, at a sensor located at the asset, sensor data, wherein attempting to match the undecoded data signal to the reference signal comprises attempting to correlate the undecoded data messages with the sensor data. The sensor may include a camera, and gathering the sensor data may involve capturing information displayed on an information display at the asset.

DETAILED DESCRIPTION

Figure 1:
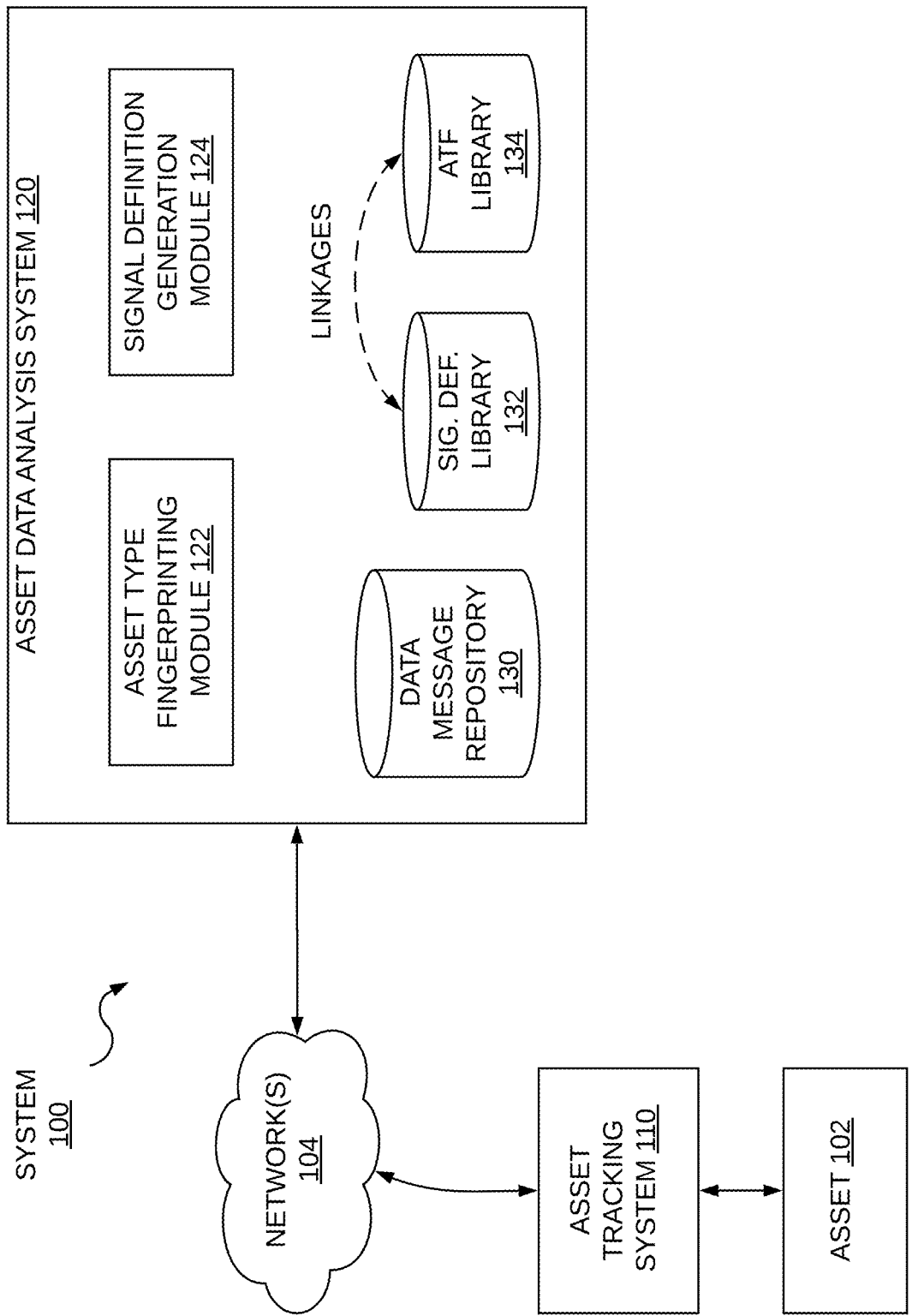
FIG. 1 is a schematic diagram of an example system for determining an asset type fingerprint for an asset and generating a signal definition to decode data collected from the asset.

Several types of assets, including passenger vehicles, transport trucks, and other vehicles, are equipped with Electronic Control Units (ECUs) that communicate with one another over Controller Area Network buses (CAN bus) to control the operation of the asset. A CAN defines a low level protocol (e.g., Standard CAN, extended CAN) for how these ECUs are to send and receive information among one another. Generally speaking, a CAN message can be broken down into an ID field that identifies the message type (and message priority, where applicable), a data field that contains a payload of data that conveys information about the asset, and other data fields necessary for the operation of the CAN. Although a CAN defines the protocol for how ECUs communicate with one another, a CAN does not define what the data that is transmitted through the CAN actually means. In other words, a CAN provides the grammar and syntax, with none of the vocabulary.

There are other standardized higher-layer protocols that define how the data payloads of CAN messages are to be translated into asset information that are highly utilized in vehicle telematics (e.g., OBD2, SAE J1939, CANopen). In J1939, for example, vehicle parameters (e.g., speed, tire pressure) are encoded into the data field of a CAN message, and are organized by Suspect Protocol Numbers (SPNs), which are expressed as labels in the data fields, and are further organized by Parameter Group Numbers (PGNs), which are expressed as labels in the ID fields. As an example, as set out in J1939-71 (revised June 2006), the vehicle parameter "wheel-based vehicle speed" is labelled as SPN 84 under PGN 65265, and is expressed in the data field of a CAN message in 2 bytes of data (providing $2^{16}=65536$ possible combinations of 1s and 0s), with incrementation at $\frac{1}{256}$ km/h per bit (incrementing the number by 1 means an increase in $\frac{1}{256}$ km/h or 0.00390625 km/h), with 0 offset (i.e., "00000000" means 0 km/h). This formula for deriving a human-intelligible value for "wheel-based vehicle speed" may make up part of a "signal definition"—a set of instructions for obtaining and decoding a data message into usable information.

Asset tracking systems can be programmed to listen to a CAN for known message types, or, where applicable, to actively solicit them via requests, and to decode such messages into tangible information following the instructions set out in the relevant protocol. Such programming instructions are typically hard coded into firmware and are rarely updated, as the standard protocols rarely change.

However, a growing number of vehicles, particularly electric vehicles (EVs), do not rely on any standardized higher-layer protocol. Even in the case of internal combustion engine (ICE) vehicles, manufacturers are increasingly using proprietary CAN messages for specialized purposes. Thus, it is becoming increasingly difficult to track vehicle information using asset tracking systems that rely only on standardized protocols to decode CAN messages. Further, memory storage capacity and logistical challenges make it impractical to pre-load every asset tracking system with the proprietary messaging protocols for decoding CAN messages from every kind of vehicle that the asset tracking system may be installed in. Moreover, in some cases, the protocols used to decode some proprietary data messages may not be made available from the manufacturer.

In addition, it is becoming increasingly difficult for an asset tracking system to determine, without express indication, what type of vehicle it is installed in, and therefore what set of messaging protocols it is to use to begin collecting information from the vehicle. In earlier times, when the majority of vehicles relied primarily on one of the common standardized higher-layer protocols, an asset tracking system could be installed in any vehicle, step through a fairly straightforward procedure to determine which of the common standardized protocols the system was installed in, and configure itself to follow the appropriate protocols accordingly. However, with greater and greater deviation from the common standardized protocols (including in jurisdictions in which communication protocol standardization is less prevalent), more sophisticated means of determining the type of vehicle that an asset tracking system is installed in are required.

Thus, the present disclosure describes systems and methods for determining the type of asset that an asset tracking system is installed in, and for decoding new and unrecognized data messages collected by such systems. These systems and methods may be applied to vehicle tracking systems to enable the speedier and more reliable identification of, and collection of data from, vehicle types that deviate from common standardized communication protocols and/or for which the instructions to decode proprietary data messages are not published.

Although the teachings provided herein are presented primarily with respect to the decoding and fingerprinting for vehicles that use CAN messaging, this is not limiting, and may be applicable to the decoding and fingerprinting for vehicles assets that use data messaging of any type, including, for example, an automotive ethernet protocol. In particular, the teachings provided herein may be particularly applicable to contexts in which lower level communication layers that facilitate data transport are well-standardized, but higher-level communication layers that describe data interpretation are less standardized, as understood according to the framework defined by the Open Systems Interconnection (OSI) model of communications within telecommunications or computing systems. Further, the teachings provided herein may be applicable to the decoding and fingerprinting for other asset types other than vehicles.

FIG. 1 is a schematic diagram of an example system 100 for determining an asset type fingerprint of an asset and generating signal definitions to decode data collected from the asset.

The system 100 includes an asset 102 that is to be tracked (i.e., monitored). The asset 102 may be any type of vehicular asset, such as a passenger vehicle, transport truck, construction equipment vehicle, sporting vehicle, utility vehicle, naval vessel, aircraft, or any other vehicular asset. The asset 102 may also be any type of non-vehicular asset, such as a transport trailer, shipping container, pallet, shipped item, power generator, other machine, or any other non-vehicular asset. Although a single asset 102 is shown, it is to be understood that the system 100 may include a plurality of assets to be tracked.

The system 100 further includes an asset tracking system 110 that collects data from the asset 102 (and other assets, if applicable). In some examples, the asset tracking system 110 may include an asset tracking device coupled to the asset 102. In other examples, the asset tracking system 110 may be integrated into the asset 102 directly, either as an embedded device, or embodied in software or firmware operating on one or more computing devices of the asset 102 itself. Indeed, the asset tracking system 110 may comprise any combination of the above possibilities. The asset tracking system 110 may be referred to generally as a telematics device or an asset-side telematics system. In cases where the asset 102 is a vehicle, the asset tracking system 110 may be referred to as a vehicle tracking system, vehicle tracking device, or the like.

In any case, the asset tracking system 110 includes one or more processors/controllers that obtain data from data sources such as sensors, electronic control units (ECUs) of the asset 102, or other data sources. Such data may include the location of the asset 102 (e.g., obtained from a GPS device), motion data (e.g., obtained from an accelerometer), vehicle data such as vehicle speed, engine oil temperature (e.g., obtained from ECUs of the asset 102), proprietary vehicle data (e.g., obtained from ECUs of the asset 102), or other data. Any of such data may be generally referred to as asset data or asset information, and in the case where the asset 102 comprises or is associated with a vehicle, vehicle data or vehicle information.

In the case of location data, the location of the asset 102 may be obtained from a locating system such as a Global Positioning System (GPS), a Global Navigation Satellite System (GNSS), a cellular tower network, Wi-Fi networks, or another locating system, associated with the asset tracking system 110 or with the asset 102 itself. In the case of sensor data, that data may be obtained from a sensor integrated into the asset tracking system 110, integrated into the asset 102 itself, or otherwise responsive to conditions at the asset 102. In the case of data obtained from an ECU of the asset 102, that data may be obtained directly from the ECU, directly from a Controller Area Network (CAN) bus to which the ECU is connected, including, in the case where the asset tracking system 110 includes an asset tracking device coupled to the asset 102, through a communication port such as an OBD2 port. Any of the above sources of data may be referred to as a data source.

Such data may be collected at the asset tracking system 110 in real-time, near real-time, or in batches. Data collected directly from a data source may be referred to as raw data. Such raw data may pass through one or more filtering steps at the asset tracking system 110 before being transmitted to a server-side system. An example of a filtering step includes passing the raw data through a low-pass filter to remove noise that is not operationally-salient to the needs of intended purpose of the data (e.g., a telematics service). Similarly, such data may pass through a data simplification process prior to further processing, including a path simplification process (i.e., curve simplification process), such as the Ramer-Douglas-Peucker algorithm, or a variation thereof. Where data is to pass through such a process, the methods described herein (i.e., asset type fingerprinting, data message decoding) may be performed on the data prior to any such process, so that the data obtained at the asset tracking system 110 may be used in the methods described herein prior to filtering. Thus, data that would otherwise be discarded by the asset tracking system 110 prior to transmission to a server-side system may first be used for decoding or fingerprinting purposes.

The system 100 further includes an asset data analysis system 120 that includes server-side data collection functionality in addition to functionality to control asset tracking systems (including the asset tracking system 110), as described herein. The asset data analysis system 120 includes storage (e.g., one or more databases) to record data collected from the asset 102 and other assets, including location data, trip/travel histories, sensor data, and asset data (e.g., vehicle data). The asset data analysis system 120 may further store user accounts and other data associated with various assets and/or asset tracking systems for the provision of telematics or analytics services. Thus, the asset data analysis system 120 generally includes one or more computing devices (e.g., servers) to store the data and programming instructions necessary to perform the functionality described herein. In particular, the asset data analysis system 120 may include at least one server with an appropriate network interface to communicate with the asset tracking system 110 and/or asset 102 via one or more computing networks and/or telecommunication networks (indicated as network(s) 104), a memory to store data and programming instructions, and one or more processors/controllers to execute the methods performed by the asset data analysis system 120 as described herein. In addition to the functionality described herein, the asset data analysis system 120 may provide a telematics service, including live tracking, record keeping, and reporting services to end user (client) devices, and may further perform various analytics services, or forward the collected data to other systems for such purposes. In some contexts, the system 100 as a whole may be referred to as a telematics system, the asset data analysis system 120 may be referred to as a server-side telematics system (or as being at least a part thereof), and the asset tracking system 110 may be referred to as a client-side telematics system.

The asset data analysis system 120 includes an asset type fingerprinting module 122 and a signal definition generation module 124. Each of these modules may be performed by one or more processors/controllers of the asset data analysis system 120 and embodied in programming instructions stored in or accessible to the asset data analysis system 120.

The asset type fingerprinting module 122, in brief, receives data messages collected by the asset tracking system 110 that originate from the asset 102 and analyses them to determine an asset type fingerprint of the asset 102. This functionality may be requested by the asset tracking system 110 when the asset tracking system 110 is unable to identify the asset type fingerprint of the asset 102 using local resources. For example, if the asset tracking system 110 is unable to identify the asset as one of its known asset types (which may correspond to a vehicle make/model/year, e.g., Ford 2008-2011, Acura RL 2006, etc., a specific trim of a particular make/model/year, or a range of make/model/years that may be communicated with via the same set of signal definitions), the asset tracking system 110 may make a request to the asset type fingerprinting module 122 for assistance. A particular asset may be identified based on criteria identified in data messages that originate from the asset 102, as will be discussed in greater detail elsewhere in this disclosure. The identity of the asset 102 has implications for how the asset tracking system 110 is to receive, solicit, and decode data from the asset 102. Therefore, identification of the asset type fingerprint of the asset 102 is a step that is generally preliminary to the asset tracking system 110 collecting data from the asset 102.

The signal definition generation module 124, in brief, receives data messages collected by the asset tracking system 110 and analyses them to determine how they are to be decoded into usable asset data (i.e., asset information). This functionality may be requested by the asset tracking system 110 when the asset tracking system 110 is unable to decode a data message, or is unable to obtain a certain type of data message (whether of a broadcasted data type or a requestable data type), using local resources. For example, if the asset tracking system 110 is unable to obtain any data message (whether broadcasted or requested) that it can identify as relating to an odometer reading, or if the asset tracking system 110 has identified a data message that is likely to relate to an odometer reading but is unable to decode it, or if the asset tracking system 110 is unable to decode a particular CAN data message of an unknown type into usable information, the asset tracking system 110 may make a request to the signal definition generation module 124 for assistance. The signal definition generation module 124 can generate a "signal definition" which defines instructions for how a particular data message is to be obtained (whether broadcasted or requested), and instructions for how that data message is to be decoded, once obtained. For example, a signal definition may define that the data message for a particular vehicle's wheel-based vehicle speed is to be identified by the presence of a particular string in the CAN message ID field at a particular index of the CAN message ID field, a particular string in the CAN message data field at a particular index in the CAN message data field, that this data message is of the broadcasted type, and further may define a formula to convert the data payload (typically coded in binary or another format) into human-intelligible information (e.g., miles or kilometers driven).

The asset data analysis system 120 further includes a data message repository 130, a signal definition library 132, and an asset type fingerprint library 134.

The signal definition library 132 contains signal definitions. A signal definition, as described above, defines instructions for how a particular data message is to be obtained (whether broadcasted or requested), and instructions for how that data message is to be decoded, once obtained. A signal definition may only be applicable to one or more particular asset types, and different asset types may use different signal definitions to communicate data of the same data type (e.g., a Ford F-150 may have a different signal definition for odometer than a Honda Civic).

The asset type fingerprint library 134 contains asset type fingerprints. Each asset type fingerprint defines criteria that uniquely identify a particular asset type based on the data messages received from that asset type. Each asset type fingerprint is linked to a particular set of signal definitions in the signal definition library 132. For example, the asset type fingerprint library 134 may contain an asset type fingerprint that defines criteria that uniquely identifies all Ford 2008-

2011 vehicles, and this asset type fingerprint may be linked to a set of signal definitions that define how to obtain odometer, vehicle speed, engine oil temperature, etc., from Ford vehicles 2008-2011. The asset type fingerprints contained in the asset type fingerprint library 134 may include asset type fingerprints that have been determined manually, generated according to an asset type fingerprint generation process as described herein, or a combination of the two.

The data message repository 130 contains real-world data messages that are attributable to known asset types. In other words, the data message repository 130 contains real-world data messages that are known to have originated from particular asset types (e.g., categories of make/model/year), for which the signal definitions to decode such data are known. These data messages may be gathered from assets in the field, either directly for the purposes of expanding the repository, or indirectly as a result of other maintenance/diagnostics activities. The data message repository 130 may be used for verification purposes to ensure that any asset type fingerprint, including any newly proposed asset type fingerprint, is unique, and does not inadvertently identify an incorrect asset type. The identity of the assets from which these data messages are obtained may be known directly from the data messages themselves, such as in the case where the data messages include an asset type identifier (e.g., VIN in the case of a vehicle), or may be known by other means such as manual data input (e.g., in a case where a technician who is present at a vehicle obtains a record of data messages from the vehicle and manually indicates the vehicle type in a data record).

Thus, the asset data analysis system 120 may be operated to generate asset type fingerprints and signal definitions for the assets that it tracks on an on-demand and ongoing basis. The asset data analysis system 120 may also add new data messages to its data message repository 130 on an ongoing basis received from various sources, such as in-field asset tracking data, asset data received by diagnostic testing, or other sources. The asset data analysis system 120 may also periodically update its asset type fingerprint library 134, its signal definition library 132, and/or the linkages therebetween, to ensure such records are kept up to date and do not conflict with one another as new asset type fingerprints and signal definitions are generated.

Figure 2:
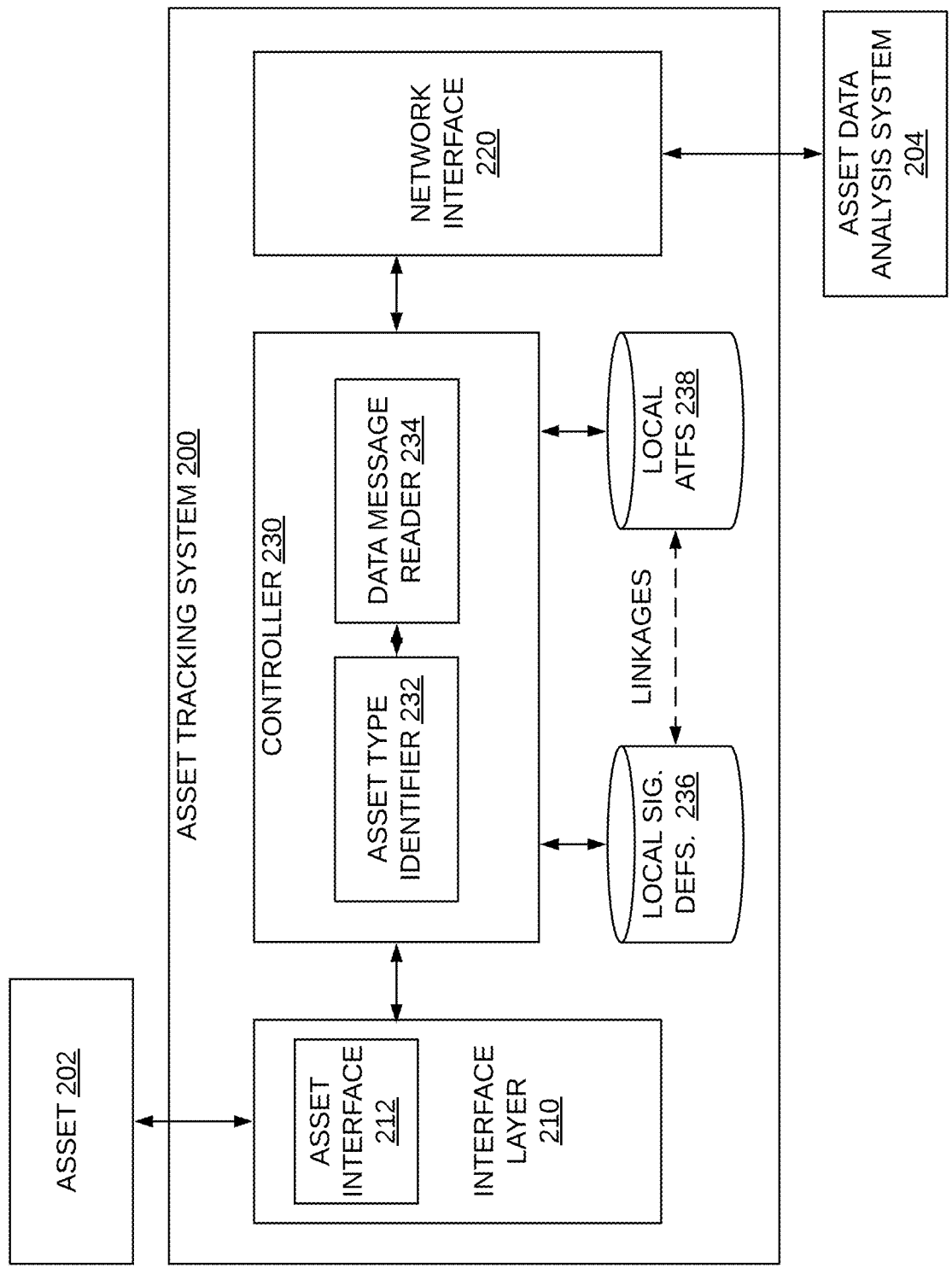
FIG. 2 is a schematic diagram of an example asset tracking system that communicates with an asset data analysis system for asset type fingerprinting and signal definition generation purposes.

FIG. 2 is a schematic diagram of an example asset tracking system 200. The asset tracking system 200 may be understood to be one example of the asset tracking system 110 of FIG. 1, and the asset 202 may be understood to be one example of the asset 102 of FIG. 1.

The asset tracking system 200 includes an interface layer 210 to receive raw data pertaining to an asset 202. Specifically, the interface layer 210 comprises one or more interfaces to receive raw data pertaining to the asset 202 from one or more data sources (e.g., an ECU of the asset 202 or a sensor or GPS device of the asset tracking system 200). The interface layer 210 may include, for example, an interface for a GPS transceiver, an interface for an accelerometer, and an interface for a communication port of the asset 202, etc. In particular, the interface layer 210 includes an asset interface 212 to receive raw data from the asset 202, either directly, over a CAN, or through a communication port, as the case may be. The data received from the asset 202 may be in the form of data messages, such as CAN messages. Such data may describe a property, state, or operating condition of the asset. For example, where the asset is a vehicle, the data may describe the location of the vehicle, speed at which the vehicle is travelling, or an engine operating condition (e.g., engine oil temperature, engine RPM, engine cranking voltage).

The asset tracking system 200 includes a network interface 220 to communicate with an asset data analysis system 204, which may be understood to be one example of the asset data analysis system 120 of FIG. 1. The network interface 220 may include a cellular modem, such as an LTE-M modem, CAT-M modem, other cellular modem, Wi-Fi modem, or any other communication device configured for communication via the network(s) with which to communicate with the asset data analysis system 204. The network interface 220 may primarily be used to transmit asset information obtained from the asset 202 to the asset data analysis system 204 for a telematics service or other purposes, and/or to receive instructions from the asset data analysis system 204 as to how to communicate with the asset 202.

The asset tracking system 200 further includes a controller 230 operatively coupled to the interface layer 210 and network interface 220. The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 includes memory, which may include ROM, RAM, flash memory, magnetic storage, optical storage, and similar, or any combination thereof, for storing programming instructions and data to support the functionality described herein. In particular, the controller 230 operates a data message reader 234 to obtain and decode data messages from the asset 202, and an asset type identifier 232 to identify an asset type fingerprint of the asset 202 based on the data messages obtained from the asset 202. The data message reader 234 and asset type identifier 232 may be embodied on non-transitory machine-readable storage media as one or more programs, modules, or sets of programming instructions, and are executable by the controller 230.

The asset tracking system 200 further includes memory to store/maintain a local set of signal definitions (sig. defs.) 236 and a local set of asset type fingerprints (ATFs) 238. The local set of signal definitions 236 may include a set of common or preliminary signal definitions that are applicable to decode data from common asset types, without necessarily including (prior to being updated by the asset data analysis system 204) all signal definitions necessary to decode the information desired from the asset 202. Similarly, the local set of asset type fingerprints 238 may include a set of common asset type fingerprints that are applicable to identify common asset types, without necessarily including (prior to being updated by the asset data analysis system 204) the asset type fingerprint necessary to identify the asset 202.

The local set of signal definitions 236 and local asset type fingerprints 238 may advantageously be stored in memory that may be easily and routinely updated, such as flash memory, rather than being hard coded into firmware or another less accessible store of memory (e.g., a Read-Only Memory). Thus, these stores of information may be updated without necessarily updating the programming instructions that operate the asset type identifier 232 and data message reader 234, hastening the process of configuring and/or reconfiguring the asset tracking system 200 to reference a specified set of signal definitions to decode asset information from the asset 202 when it is first installed at the asset 202. Rather, the programming instructions of the asset type identifier 232 and data message reader 234 may reference these data stores as needed, which may themselves be updated from time to time. Thus, an asset tracking system 200 may be used in the field to track a wide range of assets, which are expected to increasingly use proprietary and other non-standard messaging protocols, with less of a need to update its programming instructions to accommodate new asset types. Rather, the specific instructions that are necessary to accommodate new asset types (i.e., signal definitions, asset type fingerprints) may be pushed to the asset tracking system 200, via the asset data analysis system 204, as new signal definitions and asset type fingerprints are discovered and/or generated, thereby greatly simplifying the logistical challenges associated with tracking large fleets of assets which communicate via diverse and evolving messaging protocols.

Further, this system architecture, in which the local set of signal definitions 236 and local asset type fingerprints 238 are managed separately from the programming instructions of the asset type identifier 232 and data message reader 234, may be readily adopted in a software system capable of running on any suitable hardware, including the hardware of the asset 202 itself, or the hardware of any asset tracking device. In such cases, the asset type identifier 232, data message reader 234, set of local set of signal definitions 236, local asset type fingerprints 238, interface layer 210, and network interface 220, are all embodied in software and/or firmware and are agnostic to the hardware on which it runs.

In cases where the asset 202 is a vehicle, the data messages that are decoded by the data message reader 234, and/or used for the purposes of identification by the asset type identifier 232, may include CAN messages, some of which may be of a standard format, and some of which may be of a proprietary non-standard format that has yet to be decoded.

Asset Type Fingerprinting

The controller 230 is to, in cooperation with the interface layer 210 and network interface 220, operate the asset type identifier 232 to: request an asset type fingerprint for the asset 202 from the asset data analysis system 204, provide access to data messages received from the asset 202 to the asset data analysis system 204, and receive a determined asset type fingerprint from the asset data analysis system 204 that was generated based on the data messages provided. These actions may be initiated by the asset type identifier 232 after attempting to identify the asset 202 using local resources (local ATFs 238 and/or local set of signal definitions 236), and failing to identify the asset 202.

After the asset type fingerprint is received from the asset data analysis system 204, the controller 230 may add the received asset type fingerprint to its local set of asset type fingerprints 238. Further, the controller 230 may operate the data message reader 234 to obtain asset information from the asset 202 by decoding data messages received from the asset 202 with reference to the local set of signal definitions 236. Receiving the asset type fingerprint may trigger the controller 230 to reference a particular set of signal definitions in the local set of signal definitions 236, which may not have been apparent prior to receipt of the asset type fingerprint of the asset 202. In other words, the received asset type fingerprint will indicate to the data message reader 234 which signal definitions in the local set of signal definitions 236 are to be referenced to decode data received from the asset 202.

Further, in addition to receiving the asset type fingerprint of the asset 202, the controller 230 may also receive, from the asset data analysis system 204, one or more signal definitions that are associated with the received asset type fingerprint, and which are necessary to obtain data from the asset 202. These signal definitions may be added to the local set of signal definitions 236 and linked appropriately to the asset type fingerprint of the asset 202 in the local set of asset type fingerprints 238. These signal definitions may be "new" in that they may have been generated by the asset data analysis system 204 specifically to enable the asset tracking system 200 to obtain and decode data from the asset 202.

Data Message Decoding

The controller 230 is to, in cooperation with the interface layer 210 and network interface 220, operate the data message reader 234 to: attempt to obtain asset information from the data messages received from the asset 202 with reference to the local set of signal definitions 236. The controller 230 may attempt to attain predefined types of information that are expected to be collected by the asset tracking system 200 (e.g., location, odometer reading, other commonly obtained information types). Upon failure to obtain data of an outstanding data type from the asset 202 (i.e., if unable to obtain any given data type that is desired from the asset 202), then the controller 230 is to request that the asset data analysis system 204 generate a signal definition that indicates how data of the outstanding data type is to be obtained from the asset 202, provide access to undecoded data messages received from the asset 202 to the asset data analysis system 204, for the purposes of the asset data analysis system 204 generating a proposed signal definition, and receive the proposed signal definition. Once the proposed signal definition is received, the proposed signal definition may be added to the local set of signal definitions 236, and referenced by the data message reader 234.

In some examples, the outstanding data type for which assistance from the asset data analysis system 204 is provided may be a requestable data type. In such cases, the proposed signal definition may indicate how a data message of the outstanding data type is to be solicited from the asset via a request. In other examples, the outstanding data type may be a data type that is broadcasted without request, such as, for example, a broadcast CAN message. In some examples, the outstanding data type may be indicated on a list of expected, commonly available, or commonly desired data types that are to be obtained from the asset 202. For example, a standard list of expected data types for a vehicle may include odometer, Vehicle Identification Number, vehicle speed data, and fuel gauge, among others. If the asset tracking system 200 is unable to obtain one of these data types, then that data type is considered an outstanding data type, and assistance from the asset data analysis system 204 is requested to obtain this data type.

Thus, prior to identification of the asset type fingerprint of the asset 202, and prior to being updated with any new signal definitions, the local set of signal definitions 236 may contain a preliminary set of signal definitions that indicates how data messages are to be decoded into asset information for known asset types. However, upon failing to identify the asset 202 using local resources, and in response to receiving an asset type fingerprint from the asset data analysis system 204 (in addition to any new signal definitions, if applicable), the controller 230 may update the data message reader 234 to reference a particular set of signal definitions in the local set of signal definitions 236 to decode data from the asset 202 into asset information.

Figure 3:
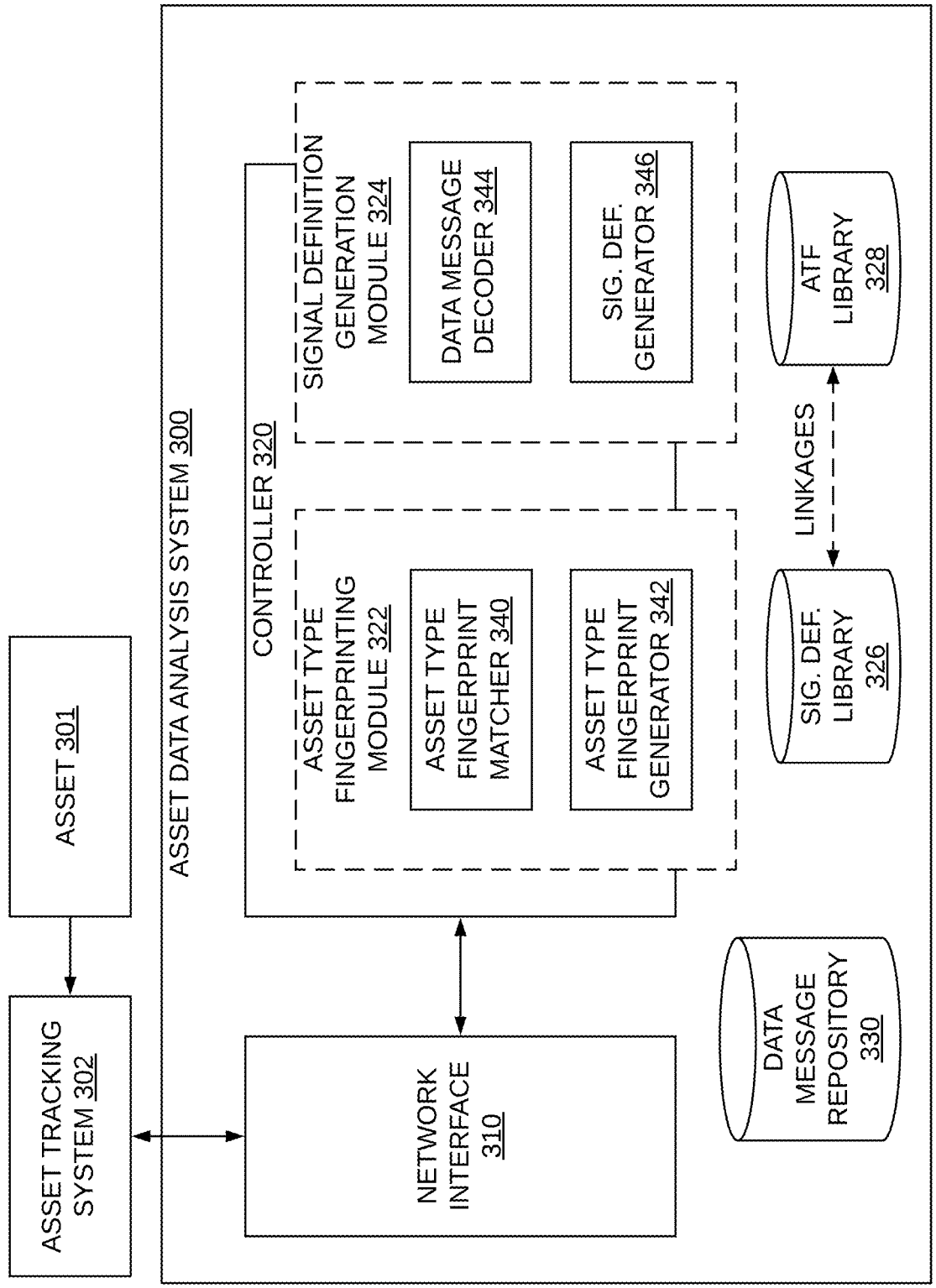
FIG. 3 is a schematic diagram of an example asset data analysis system that performs asset type fingerprinting and signal definition generation functionality.

FIG. 3 is a schematic diagram of an example asset data analysis system 300. The asset data analysis system 300 may be understood to be one example of the asset data analysis system 120 of FIG. 1.

The asset data analysis system 300 includes a network interface 310 to communicate with an asset tracking system 302, which may be understood to be one example of the asset tracking system 110 of FIG. 1. The network interface 310 is to receive data messages from the asset tracking system 302, some of which may be undecoded. The asset tracking system 302 is located at an asset 301, which may be understood to be one example of the asset 102 of FIG. 1. The network interface 310 may include a cellular modem, such as an LTE-M modem, CAT-M modem, other cellular modem, Wi-Fi modem, or any other communication device configured for communication via the network(s) with which to communicate with the asset tracking system 302 and/or asset 301.

The asset data analysis system 300 further includes a controller 320 operatively coupled to the network interface 310. The controller 320 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 320 as described herein. The controller 320 includes memory, which may include ROM, RAM, flash memory, magnetic storage, optical storage, and similar, or any combination thereof, for storing programming instructions and data to support the functionality described herein. For example, the asset data analysis system 300 may be maintained at a server or a plurality of servers in a cloud computing environment.

The controller 320 operates an asset type fingerprinting module 322 (similar to the asset type fingerprinting module 122 of FIG. 1) to identify asset types based on messages received from the asset tracking system 302, and a signal definition generation module 324 (similar to the signal definition generation module 124 of FIG. 1) to generate signal definitions to enable the asset tracking system 302 to obtain and decode data messages from assets including the asset 301. The asset type fingerprinting module 322 and signal definition generation module 324 may be embodied on non-transitory machine-readable storage media as in one or more programs, modules, or sets of programming instructions, and are executable by the controller 320.

Similar to the asset data analysis system 120 of FIG. 1, the asset data analysis system 300 further includes a data message repository 330, a signal definition library 326, and an asset type fingerprint library 328. The signal definition library 326 contains signal definitions which, as described with reference to FIG. 1, defines instructions for how data messages are to be obtained from assets and decoded. The asset type fingerprint library 328 contains vehicle type fingerprints, which, as described with reference to FIG. 1, define criteria that uniquely identify asset types based on the data messages received therefrom. Each asset type fingerprint is linked to one or more signal definitions, stored in the signal definition library 326, that define how to obtain asset information from an asset identified by that fingerprint. The data message repository 330 contains, as described with reference to FIG. 1, real-world data messages that are attributable to known asset types (e.g., in the case of vehicles, the vehicle make/model/year or other categorical identifier). That is, the data message repository 330 contains data messages that are mapped to known asset types for being known to have originated from known asset types.

The asset type fingerprinting module 322 includes an asset type fingerprint matcher 340 and an asset type fingerprint generator 342. In brief, the asset type fingerprint matcher 340 attempts to match a set of data messages relayed by the asset tracking system 302 to a known asset type fingerprint stored in the ATF library 328. The asset type fingerprint generator 342 generates, upon failure of the asset type fingerprint matcher 340 to identify a known match, a new asset type fingerprint that uniquely identifies the set of data messages sent by the asset tracking system 302. These aspects of the asset data analysis system 300 are described in greater detail below.

The signal definition generation module 324 includes a data message decoder 344 and a signal definition generator 346. In brief, the data message decoder 344 attempts to decode undecoded data messages relayed by the asset tracking system 302 using signal definitions stored in the signal definition library 326. The signal definition generator 346 generates, upon failure of the data message decoder 344 to decode a data message, a signal definition that defines how to obtain and decode data messages of that type. These aspects of the asset data analysis system 300 are described in greater detail below.

In operation, the controller 320 operates the asset type fingerprinting module 322 to receive a request for an asset type fingerprint from the asset tracking system 302, access data messages received from the asset 301 by the asset tracking system 302, and attempts to match the data messages to a known asset type fingerprint (via the asset type fingerprint matcher 340). Upon failure to match the data messages to a known asset type fingerprint, the controller 320 operates the asset type fingerprint module 322 to generate a proposed asset type fingerprint that uniquely identifies the asset 301 apart from known asset type fingerprints based on unique criteria identified in the data messages (via the asset type fingerprint generator 342), and links the proposed asset type fingerprint to a specified set of signal definitions in the signal definition library 326 that indicates how data messages of different data types are to be decoded from an asset of the proposed asset type fingerprint, and transmits the proposed asset type fingerprint to the asset tracking system 302. The specified set of signal definitions may include one or more new signal definitions generated by the signal definition generation module 324, necessary to obtain certain data types from the asset 301, as described below.

The asset tracking system 302, having received the proposed asset type fingerprint, may use the specified set of signal definitions to obtain asset information from the asset 301. Where the specified set of signal definitions includes one or more new signal definitions generated by the signal definition generation module 324, the asset data analysis system 300 may forward those new signal definitions to the asset tracking system 302 for use in its local set of signal definitions.

In some examples, the asset type fingerprinting module 322 may check any newly proposed asset type fingerprint against the data message repository 330 (and/or the ATF library 328) to ensure that the proposed asset type fingerprint uniquely identifies the asset 301, and does not inadvertently identify a different known asset type for which there are messages stored in the data message repository 330. That is, upon failure to match the data messages forwarded by the asset tracking system 302 to a known asset type fingerprint, and prior to transmitting a new proposed asset type fingerprint to the asset tracking system 302, the controller 320 determines whether the proposed asset type fingerprint conflicts with an existing asset type fingerprint stored in the library of asset type fingerprints 328 or with the repository of data messages 330, and upon determination that there is no conflict, enters the proposed asset type fingerprint into the library of asset type fingerprints 328, and only transmits the proposed asset type fingerprint to the asset tracking system 302 upon determination that there is no conflict. Additional techniques for asset type fingerprint matching are described elsewhere in this disclosure.

Figure 4:
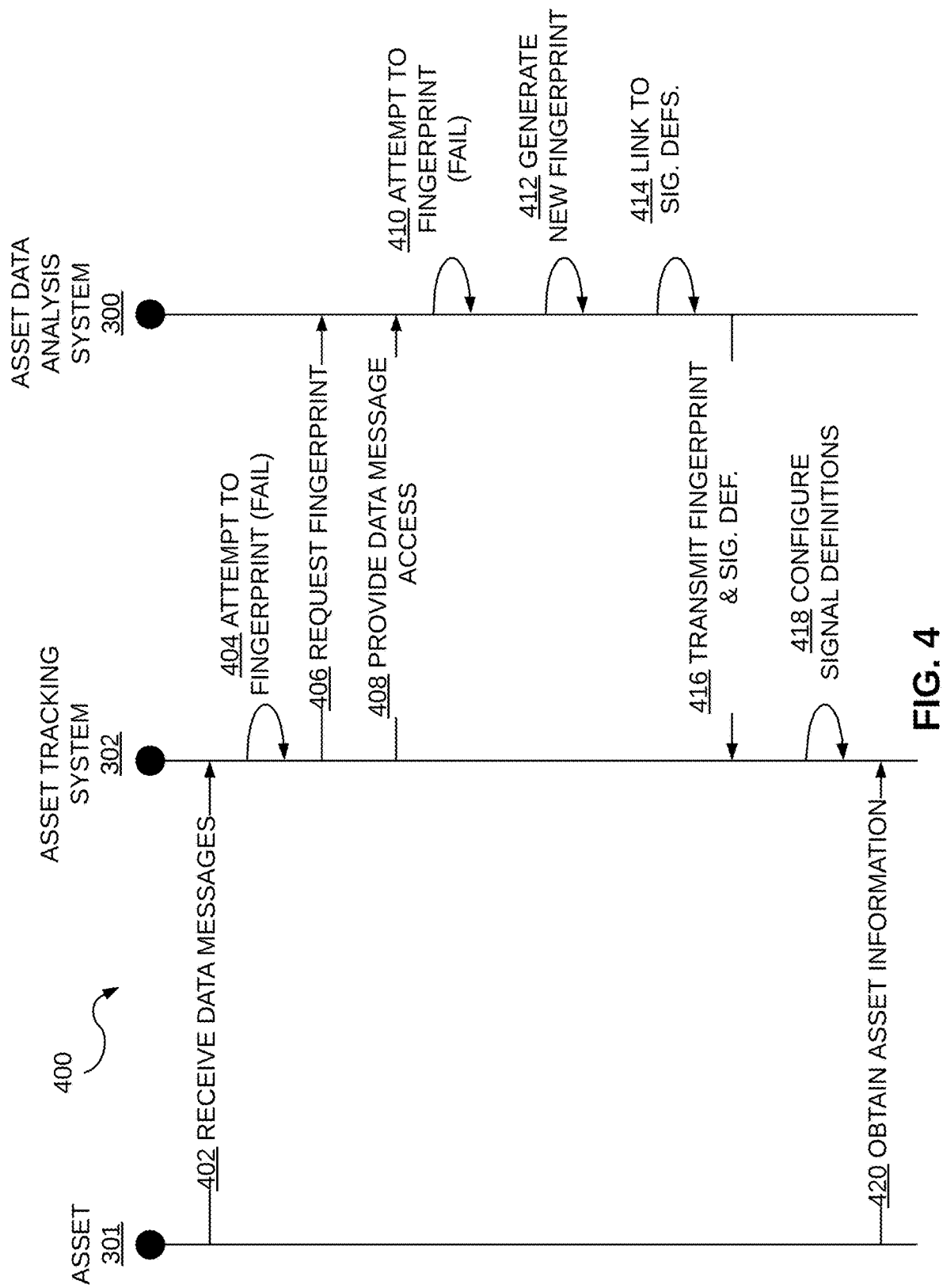
FIG. 4 is a flow diagram of an example method for determining an asset type fingerprint of an asset.

FIG. 4 is a flow diagram of an example method 400 for determining an asset type fingerprint of an asset. The method 400 may be understood to be one example of how the asset data analysis system 300 may generate a new asset type fingerprint for the asset 301, and thus, for convenience, the method 400 will be described with respect to the elements related to the asset data analysis system 300. However, it is to be understood that the method 400 may be performed by other systems.

At operation 402, the asset tracking system 302, which is located at the asset 301, receives data messages from the asset 301. The data messages received from the asset 301 may be broadcasted over a network (e.g., CAN) available to the asset tracking system 302, or may be requested from the asset 301 by requests transmitted from the asset tracking system 302. The asset tracking system 302 may store a list of common request addresses and request formats that are expected to produce responses from the asset 301 for this purpose. For example, if odometer is an outstanding data type, the asset tracking system 302 may make requests at common request addresses that can be expected to respond with odometer information.

At operation 404, the asset tracking system 302 attempts to identify an asset type fingerprint of the asset 301 based on the received data messages. In some examples, the asset tracking system 302 may reference any number of, or the entirety of, the asset type fingerprints stored in the asset type fingerprint library 328, in parallel. In other examples, the asset tracking system 302 may step through a specified sequence of checking common asset type fingerprints before moving onto less common asset type fingerprints. This operation may involve testing the asset 301 with requests, and reading the responses received (if any), in addition to listening to broadcast data from the asset 301. Where the operation involves testing the asset 301 with requests, the asset tracking system 302 may step through a specified sequence of sending data requests that are most likely to be safe (i.e., that are least likely to disrupt the asset 301), before proceeding to further testing. In some examples, the asset tracking system 302 may attempt to communicate with the asset 301 by making as many kinds of requests as possible, with the exception of certain requests that are on a "denylist" that are known to potentially pose a risk to the operation (e.g., safety) of the asset 301 if made to the wrong asst type. In other examples, the asset tracking system 302 may attempt to communicate with the asset 301 by making only a limited number of requests that are listed on an "allowlist" that are known to to be unlikely to interfere with the operation (e.g., safety) of the aset 301, even if the asset type of the asset 301 is unknown. Further, in some examples, this operation may involve listening for and/or testing various physical parameters of a CAN of the asset 301, such as, for example, data bit rate, which may serve as a prerequisite for reading data messages from the asset 301 and/or transmitting data requests to the asset 301. Further, in some examples, this operation may involve determining a state of the asset 301 (e.g., charging state, engine state) and initiate testing of the asset 301 during an appropriate window in time that is conducive to determining a fingerprint of the asset 301.

If successful, then upon succeeding to identify the asset type fingerprint of the asset 301, the asset tracking system 302 configures itself to obtain asset information from the asset 301 by decoding data messages received from the asset 301 with reference to a particular set of signal definitions in the local set of signal definitions that is associated with the asset type fingerprint of the asset 301.

Alternatively, if unsuccessful, then at operation 406, the asset tracking system 302 requests an asset type fingerprint for the asset 301 from the asset data analysis system 300. Further, at operation 408, the asset tracking system 302 provides access to data messages received from the asset 301 to the asset data analysis system 300 for this purpose.

At operation 410, the asset data analysis system attempts to fingerprint the asset 301 based on the data messages. The asset data analysis system 300 may succeed in this operation where the asset tracking system 302 failed because the asset data analysis system 300 has access to a more extensive asset type fingerprint library 328 than the asset tracking system 302 has direct access to.

Alternatively, upon failure to fingerprint the asset 301, at operation 412, the asset data analysis system 300 generates a proposed asset type fingerprint that uniquely identifies the asset 301 among known asset type fingerprints based on unique criteria identified in the data messages received from the asset 301. Techniques for generating such a proposed fingerprint are discussed in greater detail elsewhere in this disclosure.

At operation 414, the asset data analysis system 300 links the generated asset type fingerprint to a specified set of signal definitions that indicates how data messages of different data types are to be decoded from an asset of the proposed asset type fingerprint. In other words, the asset data analysis system 300 links the proposed asset type fingerprint to one or more signal definitions that may be used to decode data messages received from the asset 301. One or more of these signal definitions may be newly generated signal definitions, as discussed in greater detail below.

At operation 416, the asset data analysis system 300 transmits the proposed asset type fingerprint, and any new signal definitions, if applicable, to the asset tracking system 302.

At operation 418, the asset tracking system 302 is configured to obtain asset information from the asset 301 by decoding data messages received from the asset 301 with reference to a specified set of signal definitions in its local set of signal definitions. In other words, the asset tracking system 302 is configured to decode data messages received from the asset 301 in accordance with the set of signal definitions linked to its proposed asset type fingerprint.

At operation 420, the asset tracking system 302 proceeds to collect asset information from the asset 301 by decoding data messages received from the asset 301 with reference to the configured set of signal definitions, and to cause its network interface to transmit such asset information to the asset data analysis system 300.

It should be noted that the identification of a fingerprint for an asset (e.g., at operation 410), and the generation of a new fingerprint for an asset (e.g., at operation 412), should not be limited to the case where the fingerprint definitively identifies an asset at the highest degree of specificity possible. Rather, in some cases, the fingerprint (whether identified or generated) may be understood as a "working" fingerprint that distinguishes a particular asset type from other asset types at least in terms of how asset information is obtained from the asset through signal definitions. For example, a fingerprint may define a group of assets (e.g., all Ford Mustang vehicles 2012-2014). These groups of assets may or may not align with make/model/year and other descriptors defined by the manufacturers of such assets. In some cases, the identification or generation of a fingerprint for an asset may be understood as an "intermediate" step that narrows down the range of possible modes of communication with the asset without definitively and exhaustively defining those modes of communication.

Figure 5A:
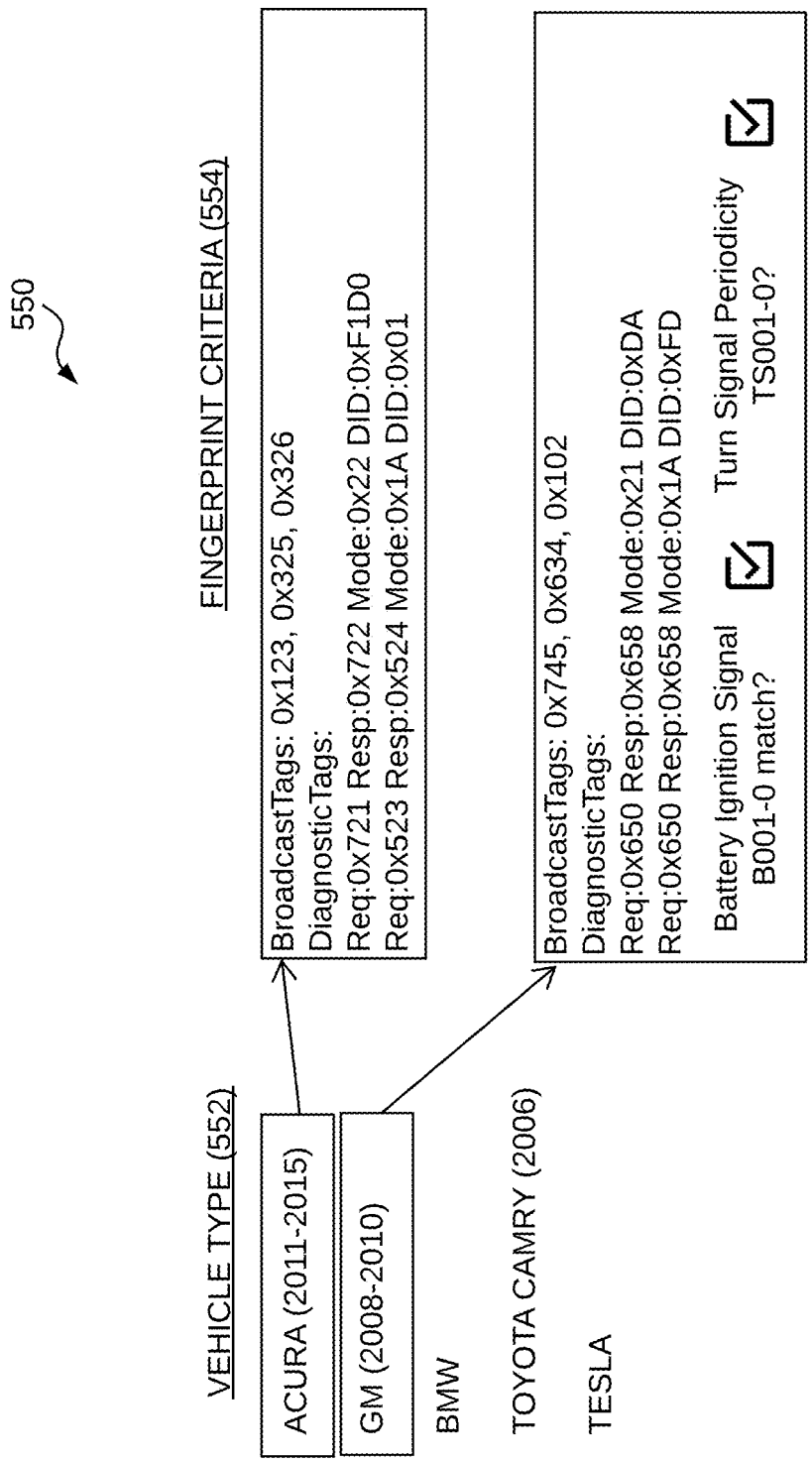
FIG. 5A is a diagram of an example data structure to store asset type fingerprints.

FIG. 5A is a diagram of an example data structure 550 to store asset type fingerprints. The data structure 550 may be understood to be one example of how the ATF library 134 of FIG. 1 or the local ATFs 238 of FIG. 2 may be structured. In the example shown, the data structure 550 contains asset type fingerprints for asset types that are vehicle types (i.e., vehicle type fingerprints), but it is to be understood that data structures that contain asset type fingerprints for other asset types may be arranged similarly.

In the data structure 550, each vehicle type 552 is linked to one or more criteria 554 that uniquely identify that vehicle type 552 apart from other vehicle types 552. Thus, for example, the vehicle type ACURA (2011-2015) is linked to a set of fingerprint criteria 554 that includes: Broadcast Tags: 0x123, 0x325, 0x326; and Diagnostic Tags: Req:0x721 Resp:0x722 Mode:0x22 DID:0xF1D0, and Req:0x523 Resp:0x524 Mode:0x1A DID:0x01 (i.e., "message protocol data" that defines how certain data messages are to be obtained from the asset). Thus, if an asset is observed to broadcast the aforementioned broadcast tags, and is observed to respond to requests in accordance with the aforementioned diagnostic tags, then that asset can be concluded to be an Acura vehicle with model years 2011-2015.

In some examples, an asset type fingerprint may include the presence/identification of a particular signal characteristic found in the data payloads of data messages received from an asset. For example, one criteria of an asset type fingerprint may include the satisfaction of a certain signal heuristic that is known to be satisfied by a unique asset type (e.g., a turn signal message is broadcasted repeatedly at a certain frequency, fuel level is updated at a known rate or within a range or known rates). Thus, in the data structure 550, the vehicle type GM (2008-2010) is linked to fingerprint criteria 554 that includes the requirement for the satisfaction of Turn Signal Periodicity "TS001-0". As another example, another criteria of an asset type fingerprint may include the matching of a particular signal feature in the data payloads of the data messages to a reference signal (e.g., via machine learning) that is known to originate from a unique asset type (e.g., a battery voltage signal upon ignition of a vehicle follows a unique profile that will match with a reference signal of a particular vehicle type). Thus, in the data structure 550, the vehicle type GM (2008-2010) is linked to fingerprint criteria 554 that includes the requirement that battery voltage data must include a signal characteristic that matches with Battery Ignition Signal "B001-0". Indeed, any of the signal matching techniques described below with respect to signal generation may be applied to asset type fingerprinting.

It should be noted that, in some examples, different model years may be grouped together as being uniquely identified by the same set of fingerprint criteria 554 if and only if those same model years correspond to the same set of signal definitions that are used to obtain asset information from those assets. Thus, for simplicity, multiple different model years, and even multiple different makes/models, may be grouped together as uniquely identified by the same fingerprint criteria 554, and those assets can all be linked to the same set of signal definitions. In other examples, separate (and in some cases, duplicate) sets of fingerprint criteria 554 may be maintained for different asset types, despite those asset types being linked to the same set of signal definitions.

Figure 5B:
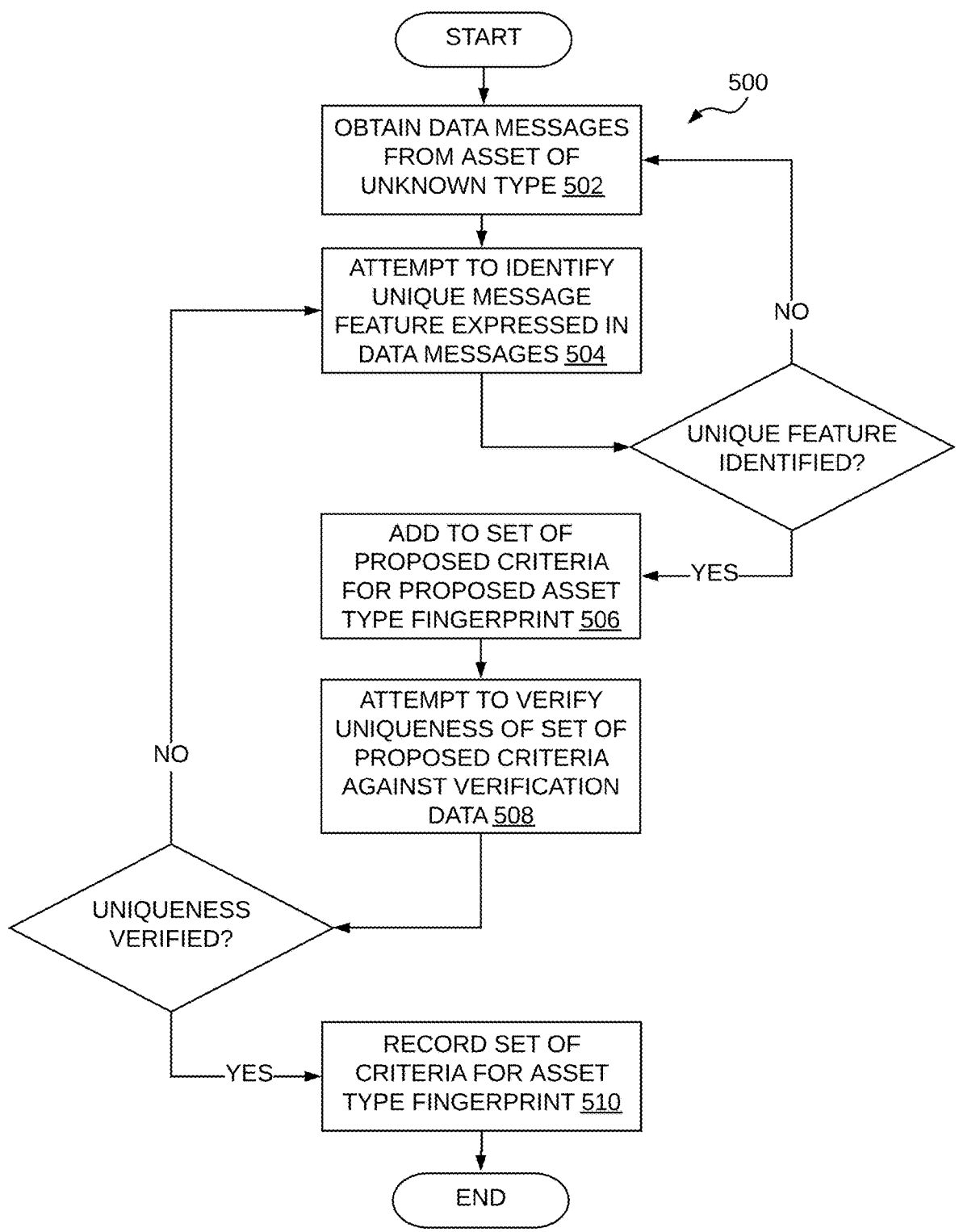
FIG. 5B is a flowchart of an example method for generating a new asset type fingerprint for an asset.

FIG. 5B is a flowchart of an example method 500 for generating an asset type fingerprint for an asset. For illustrative purposes, the method 500 will be described with reference to the asset data analysis system 300 of FIG. 3, and with reference to generating an asset type fingerprint that identifies the asset 301. Further, the method 500 may be understood to be one way in which operation 412 of the method 400 may be performed. However, it is to be understood that the method 500 may be applied to other systems.

At operation 502, the asset data analysis system 300 obtains data messages from the asset 301, which is an asset of an unknown asset type.

At operation 504, the asset data analysis system 300 attempts to identify one or more unique message features expressed in the data messages obtained from the asset 301. A unique message feature may include the presence of a particular broadcast message that is not found on other assets, or the receipt of a particular response to a particular request (e.g., any one or combination of fingerprinting criteria described with reference to FIG. 5A, above). The asset data analysis system 300 may determine whether any given message feature is unique to the asset 301 by determining whether that message feature is present in the data message repository 330 (i.e., present in data messages obtained from a known asset type), and/or whether that message feature is present as a criterion in an asset type fingerprint stored in the ATF library 328. The asset data analysis system 300 may systematically select messages from the data obtained and attempt to match message features identified in the data against these verification data sources to determine possible candidates for unique message features.

If no unique message feature is identified, the method 500 reverts to operation 502, where more data is obtained from the asset 301. The asset data analysis system 300 may request additional data from the asset 301 and/or asset tracking system 302 or merely wait until more data is obtained. This portion of the method 500 may repeat until sufficient information is available to identify at least one unique feature.

If a unique message feature is identified, at operation 506, the asset data analysis system 300 adds the identified message feature to a set of proposed criteria that defines a proposed asset type fingerprint of the asset 301. In other words, the presence of the identified unique data message feature is proposed as criteria for uniquely identifying the asset 301 apart from known asset types. In some cases, only a single unique message feature may be identified, and only a single unique message feature may be necessary to distinguish the asset 301 apart from other known asset types. In other cases, a plurality of unique message features may be identified.

At operation 508, the asset data analysis system 300 attempts to verify the uniqueness of the set of proposed criteria against verification/comparative data sources (e.g., data message repository 330 and/or ATF library 328). The asset data analysis system 300 determines whether the proposed asset type fingerprint is unique in view of the repository of data messages 330 and the library of asset type fingerprints 328. In other words, the asset data analysis system 300 determines whether the proposed asset type fingerprint conflicts with an existing asset type fingerprint stored in the library of asset type fingerprints 328 or with the repository of data messages 330 which contains data messages mapped to known asset types. There may be a conflict between the proposed asset type fingerprint and the library of asset type fingerprints 328 if the proposed fingerprinting criteria is identical to the fingerprinting criteria of an existing asset type fingerprint. There may be a conflict between the proposed asset type fingerprint and the repository of data messages 330 if the repository of data messages 330 contains a set of data messages received from another known asset type that would satisfy the fingerprinting criteria of the proposed asset type fingerprint.

If the proposed criteria for the asset type fingerprint of the asset 301 is verified as being unique (i.e., if there are no conflicts with existing data/fingerprints), then at operation 510, the set of criteria is recorded as a proposed asset type fingerprint for the asset 301 (i.e., in ATF library 328). The proposed asset type fingerprint may further be transmitted to the asset tracking system 302.

If the proposed criteria for the asset type fingerprint of the asset 301 is not verified as being unique (i.e., if there is a conflict with existing data/fingerprints), the method 500 reverts to operation 504, in which the asset data analysis system 300 attempts to identify additional unique message features. The method 500 may further revert to operation 502 to solicit, or wait for, further data.

Further, optionally, where it is determined that a proposed asset type fingerprint conflicts with a known asset type, the asset data analysis system 300 may flag the conflicting fingerprint for updating, and may initiate the gathering of additional data from assets of the known asset type so that a more precise fingerprint for the known asset type can be defined. For example, if a proposed asset type fingerprint for a Ford Focus 2022 is determined to conflict with an existing fingerprint for a Hyundai Elantra 2020, additional information may be gathered, compiled, or analysed from Hyundai Elantra 2020s (in addition to more information from Ford Focus 2022s) so that a more precise fingerprint may be generated for each of the respective asset types. Thus, upon determination that a proposed asset type fingerprint conflicts with a fingerprint of a known asset type, the asset data analysis system 300 may collect additional information and update the fingerprint associated with the existing (and conflicting) asset type fingerprint.

In some examples, the method 500 may be streamlined in that the verification of uniqueness of each unique message feature and of each set of proposed criteria may be evaluated simultaneously. That is, in some examples, once a single unique message feature is identified as uniquely identifying the asset 301, then that unique message feature may serve as the set of proposed criteria for the asset type fingerprint, and recorded as the criteria for the asset type fingerprint.

Returning to FIG. 3, the signal definition generation module 324 includes a data message decoder 344 and a signal definition generator 346. The controller 320 operates the signal definition generation module 324 to receive a request for a proposed signal definition from the asset tracking system 302, access undecoded data messages received from the asset 301 by the asset tracking system 302, and attempt to decode the undecoded data messages (via the data message decoder 344). In response to failure to decode the data messages, the controller 320 operates the signal definition generation module 324 to generate a new signal definition that indicates how a data message having a format of the undecoded data messages is to be decoded into asset information (via the signal definition generator 346), and transmit the new signal definition to the asset tracking system 302.

The controller 320 may also, following the generation of a new signal definition, link the new signal definition to an asset type fingerprint in the library of asset type fingerprints 328, which may be a newly proposed asset type fingerprint, as discussed elsewhere in this disclosure.

The asset tracking system 302, having received the new signal definition, may incorporate the new signal definition into its local set of signal definitions, and may proceed to obtain asset information from the asset 301 with reference to this signal definition.

Figure 6:
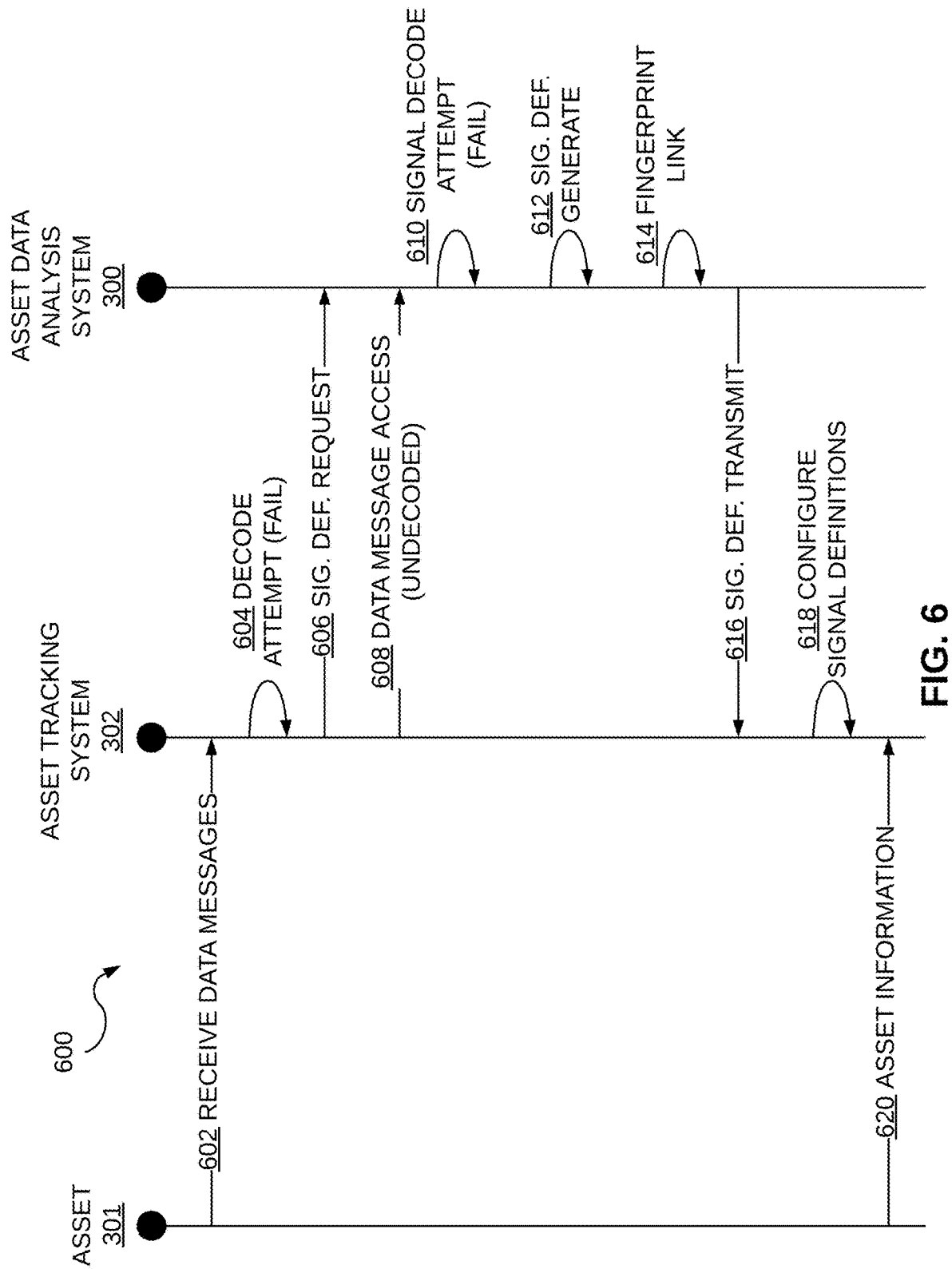
FIG. 6 is a flow diagram of an example method for determining a signal definition to decode data collected from an asset.

FIG. 6 is a flow diagram of an example method 600 for generating a signal definition to decode data collected from an asset. The method 600 may be understood to be one example of how the asset data analysis system 300 may generate a new signal definition for the asset 301, and thus, for convenience, the method 600 will be described with respect to the elements related to the asset data analysis system 300. However, it is to be understood that the method 600 may be performed by other systems.

At operation 602, the asset tracking system 302, located at the asset 301, receives data messages from the asset 301. The data messages received from the asset 301 may be broadcasted over a network (e.g., CAN) available to the asset tracking system 302, or may be requested from the asset 301 by requests transmitted from the asset tracking system 302. The asset tracking system 302 may store a list of common request addresses and request formats, that are expected to produce responses from the asset 301, for this purpose.

The asset tracking system 302 maintains a set of signal definitions that indicates how data messages of different data types received from different assets are to be decoded into asset information.

At operation 604, the asset tracking system 302 attempts to obtain asset information from the data messages received from the asset 301 with reference to this set of signal definitions. Upon successful decoding of the data messages, the asset information may be transmitted to the asset data analysis system 300.

Alternatively, upon failure to obtain asset information of an outstanding data type from the asset 301, at operation 606, the asset tracking system 302 requests a new signal definition from the asset data analysis system 300 for obtaining the outstanding data type from the asset 301, and at operation 608, provides access to undecoded data messages received from the asset 301 to the asset data analysis system 300 for this purpose. The outstanding data type may be present in the batch of undecoded messages provided to the asset data analysis system 300, whether as data messages that were received via broadcast or data messages that were received upon request to the asset 301, yet still may be unable to be decoded by local resources at the asset tracking system 302. Where there is an outstanding data type that is present in the batch of undecoded data messages provided to the asset data analysis system 300, an undecoded data signal constructed from these undecoded data messages may be matched to a reference signal (i.e., a comparable data signal of a known data type and format), and a signal definition may be generated to decode the outstanding data type, as described herein.

At operation 610, the asset data analysis system 300 attempts to decode an undecoded data message with reference to the signal definition library 326. If the decoding is successful, then the asset data analysis system 300 may transmit the signal definition that was used to decode the undecoded data message to the asset tracking system 302 for its use in continuing to obtain asset data from the asset 301.

At operation 612, in response to a failed attempt at decoding, the asset data analysis system 300 generates a new signal definition that indicates how a data message having a format of the undecoded data message is to be decoded into asset information. Once generated, the asset data analysis system 300 may, at operation 614, link the new signal definition to an asset type fingerprint in the library of asset type fingerprints 328 at the asset data analysis system 300.

At operation 616, the asset data analysis system 300 transmits the new signal definition to the asset tracking system 302.

At operation 618, the asset tracking system 302 receives the new signal definition, and adds the new signal definition to its local set of signal definitions. In other words, the asset tracking system 302 configures itself to reference a specified set of signal definitions, which includes the new signal definition, now added to its local set of signal definitions, to obtain asset information from the asset 301.

At operation 620, the asset tracking system 302 proceeds to collect asset information from the asset 301 by decoding data messages received therefrom with reference to the configured set of signal definitions, and to cause its network interface to transmit such asset information to the asset data analysis system 300.

Figure 7A:
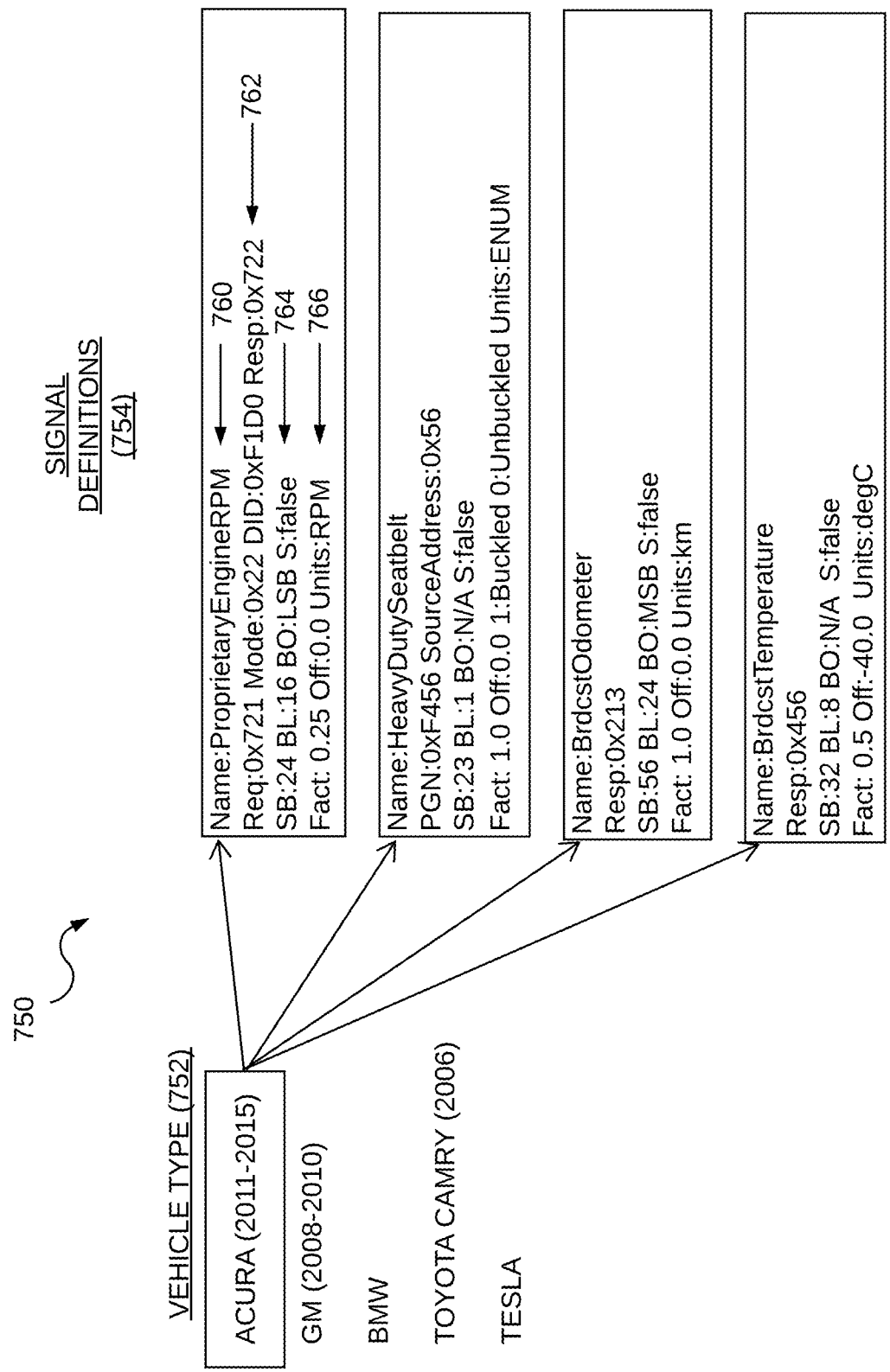
FIG. 7A is a diagram of an example data structure to store signal definitions.

FIG. 7A is a diagram of an example data structure 750 to store signal definitions. The data structure 750 may be understood to be one example of how the signal definition library 132 of FIG. 1 or the local set of signal definitions 236 of FIG. 2 may be structured. In the example shown, the data structure 750 contains signal definitions for asset types that are vehicle types, but it is to be understood that data structures that contain signal definitions for other asset types may be arranged similarly.

In the data structure 750, each vehicle type 752 is linked to a set signal definitions 754 that are to be used to decode (and in some cases, request) asset information from the linked vehicle type 752. Thus, for example, the vehicle type 752 of ACURA (2011-2015) is linked to four signal definitions 754, labelled "ProprietaryEngineRPM", "HeavyDuty-Seatbelt", "BrdcstOdometer", and "BrdcstTemperature". Each of these signal definitions 754 may be used to obtain a different type of data from an ACURA (2011-2015). For example, RPM may be obtained using the signal definition "ProprietaryEngineRPM" by making a request on 0x721 of 0x0322F1D0, receiving a response back from 0x722, parsing out 16 bits starting at bit 24, in an least-significant byte (LSB) byte order, converting the resulting binary value to decimal, taking into account that the number is an unsigned binary number, multiplying the resulting decimal value by a data scaling factor of 0.25 and applying a data offset of 0.0.

In general, each signal definition 754 includes label data 760 that labels the signal definition (e.g., "Name:ProprietaryEngineRPM"), message protocol data 762 (i.e., messaging instructions) that defines the messaging protocol to solicit/receive the data (e.g., "Req:0x721 Mode:0x22 DID:0xF1D0, Resp:0x722"), payload identification data 764 (i.e., payload identification instructions) that defines where/how the payload is to be found in a data message (e.g., "SB:24 BL:16 BO:LSB", S:false"), and payload conversion data 766 (i.e., payload conversion instructions) that defines how the payload is to be translated into real-world values (i.e., engineering units, human-intelligible information) (e.g., "Fact: 0.25 Off:0.0", Units:RPM). The payload conversion data 766 may be referred to as the "formatting characteristics" of the signal definition, as it defines how a data signal is to be formatted when it is plotted and/or converted into a real-world value.

A signal definition may include additional parameters that further define how data is to be obtained from a vehicle. These additional parameters may be made out of necessity (e.g., certain data may be only be available during certain times), out of preference (e.g., it may be preferred that certain data be captured at certain times or at certain rates), or for other reasons. For example, a signal definition may define a request interval that defines how often a request for a certain type of data is to be made to the vehicle (e.g., a request for seatbelt status may be made every second whereas a request for odometer may be made every twenty seconds). As another example, a signal definition may define a suitable period of time during which it is appropriate to attempt to obtain information from the vehicle, which may be based on a status of the vehicle, and may further be based on the type of data to be obtained (e.g., battery voltage data may be obtained during vehicle ignition, charging rate data may be obtained while the vehicle is in a "charging" state). Other communication parameters are contemplated.

As mentioned above, a signal definition may only be applicable to one or more particular asset types, and different asset types may use different signal definitions to communicate data of the same data type (e.g., a Ford F-150 may have a different signal definition for odometer than a Honda Civic). However, it should further be noted that in some cases, different asset types may use the same messaging instructions to communicate different data types (e.g., a Ford F-150 may use "Req:0x721 Mode:0x22 DID:0xF1D0, Resp: 0x722" to communicate RPM, but a Honda Civic may communicate engine speed through the same messaging instructions), further highlighting the benefit of maintaining an accurate mapping between asset type fingerprints and signal definitions.

Figure 7B:
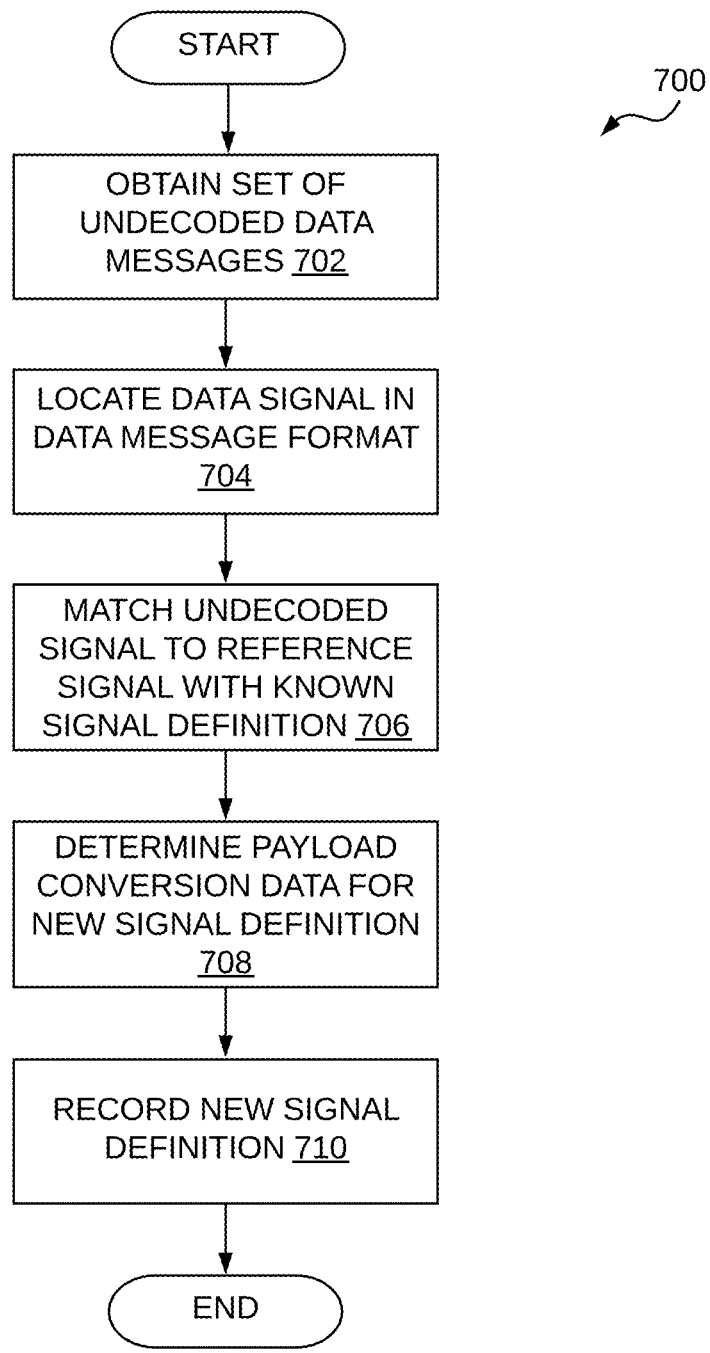
FIG. 7B is a flowchart of an example method for generating a new signal definition to decode data collected from an asset.

FIG. 7B is a flowchart of an example method 700 for generating a signal definition to obtain asset information from an asset. For illustrative purposes, the method 700 will be described with reference to the asset data analysis system 300 of FIG. 3, and with reference to generating a signal definition to obtain asset information from the asset 301. Further, the method 700 may be understood to be one way in which operation 612 of the method 600 may be performed. However, it is to be understood that the method 700 may be applied to other systems.

At operation 702, the asset data analysis system 300 obtains a set of undecoded data messages from the asset 301. The set of undecoded data messages may include a set of the same type of data message collected over time. This may be discovered by determining that each of the data messages in a given set of undecoded data messages contains the same message identifier or data expected to be indicative of message identifier (e.g., the same CAN ID field). The information used to obtain the undecoded data messages (i.e., message protocol data 762 in FIG. 7A) may be recorded, at a later step, as the message protocol data for the to-be-identified undecoded data signal.

At operation 704, the asset data analysis system 300 locates a data signal in the data message format of the undecoded data messages. In other words, the asset data analysis system 300 identifies which bits of data in the undecoded data messages correspond to a data signal that is convertible into asset information, apart from other bits of data in the undecoded data messages that do not necessarily convert into asset information, or which convert into another type of asset information that is not presently of interest. This process may be referred to identifying a location, position, or index, of a data signal (i.e., data payload) in the data messages.

An example of such a process is described in greater detail with reference to FIG. 8A, below, where the example of identifying a data signal in an undecoded CAN message using a frequency distribution analysis is discussed.

Figure 8A:
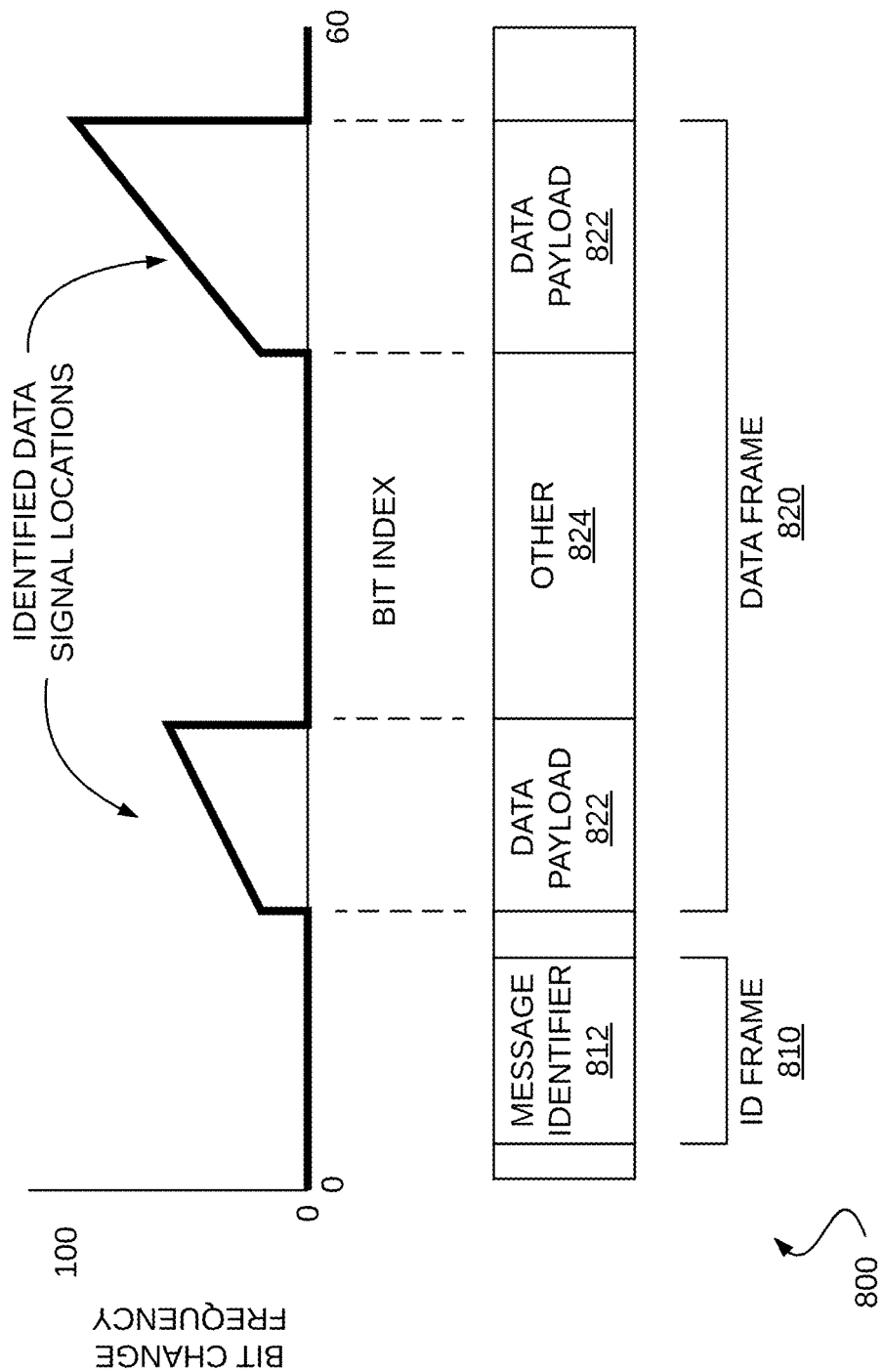
FIG. 8A is a schematic diagram that illustrates the application of an example technique to locate a data signal in a set of undecoded data messages.

In FIG. 8A, a CAN message format 800 is shown. The example CAN message format 800 includes an ID frame 810 which includes a message identifier 812. The message identifier 812 uniquely identifies a particular CAN message apart from other CAN messages used on a CAN of a given asset. The example CAN message format 800 further includes a data frame 820, which may include one or more data payloads 822, and other data 824 that does not correspond to a data payload. Other data 824 may be used to identify the various data payloads 822 present in the data frame 820 (e.g., as with SPNs in J1939), used for other purposes, or be unused.

If the precise location of a data payload 822 is unknown, various techniques may be used to determine its location. One example technique is to plot the frequency distribution of the bits in the data frame 820 across a plurality of CAN messages of the same CAN message type collected over time. Over time, it may be expected that the bits that correspond to a data payload 822 will change, and will change more frequently in its least significant digits, and less frequently in its most significant digits. Other bits that do not correspond to a data payload 822 may be expected to remain static over time. Thus, a plot of frequency of bit change versus bit index may be expected to yield one or more features (e.g., resembling a "triangle") that define the beginning and end bits of the data payload 822. This frequency distribution analysis may be used to determine the location of a data signal in a data message, which may be used in further analysis.

Figure 8B:
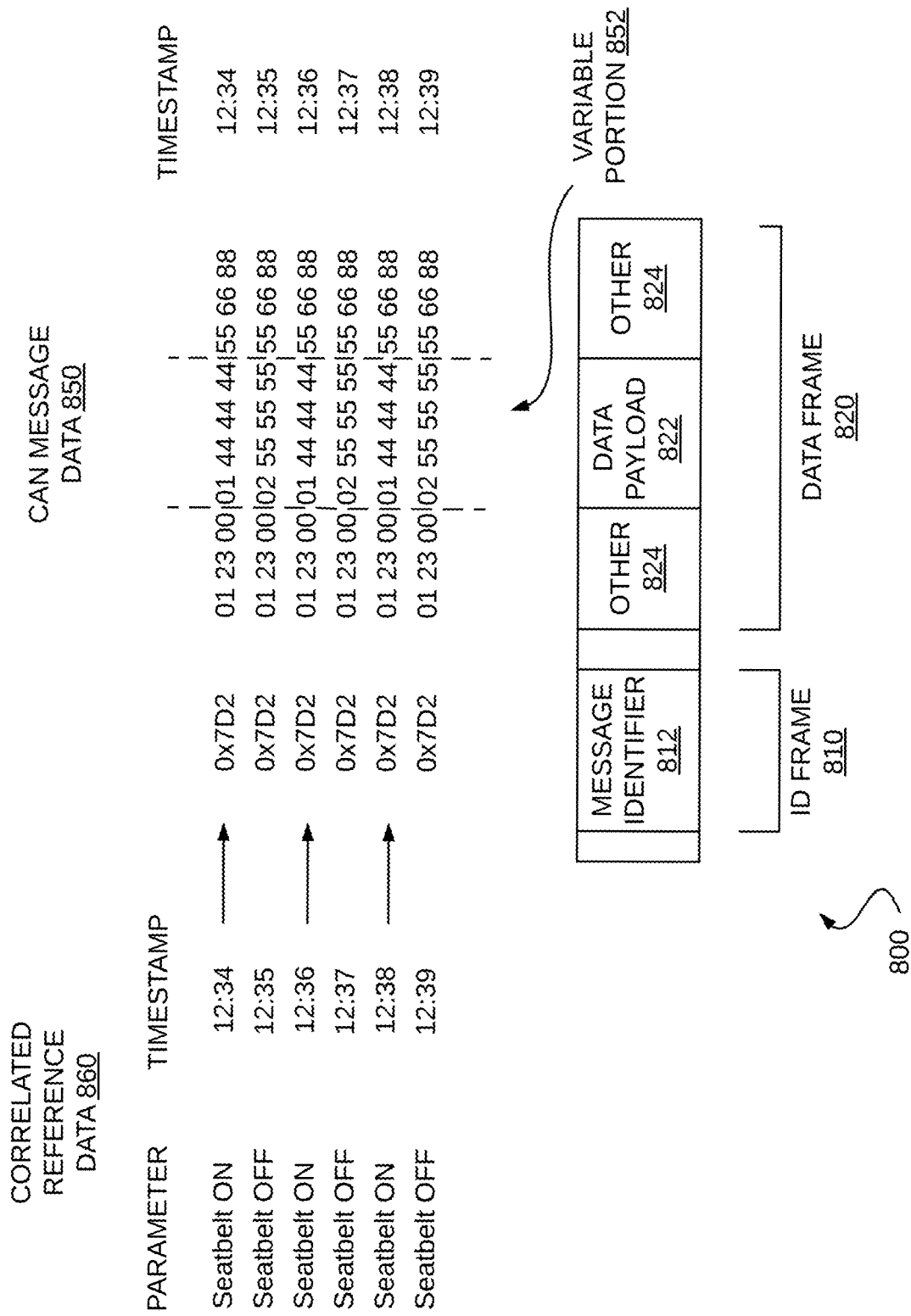
FIG. 8B is a schematic diagram that illustrates the application of another example technique to locate a data signal in a set of undecoded data messages.

As described in another example illustrated in FIG. 8B, a location of a data signal in a data message of an unknown format may be determined by correlating changes in a set of those data messages with known changes in a property, state, or operating condition of the asset. In other words, a change in a property, state, or operating condition of the asset that is known to have occurred at a particular point in time may be matched to an observed change in the data messages that occured at the same point in time. For example, in a case where the asset 301 is a vehicle, and the asset tracking system 302 includes a sensor that can detect a property, state, or operating condition of the asset 301 (e.g., a camera), the sensor may detect periods of time in which a seatbelt in a vehicle is engaged, and periods of time in which the seatbelt is disengaged, and these periods of time may be matched to periods of time in which corresponding changes in the data messages are observed (e.g., by matching time stamps). As shown in FIG. 8B, CAN message data 850 is matched to correlated reference data 860. In particular, timestamps associated with the CAN message data 850 are matched to timestamps of the correlated reference data 860, which shows that changes in a parameter that indicates seatbelt engagement correlate with changes in a particular portion (i.e., the variable portion 852) of the CAN messages. The variable portion 852, which is observed to change in response to changes in the seatbelt parameter, may be taken as the portion of the data messages that contain the data payload relating to seatbelt parameter.

With the location of the data payload in the data messages determined, a data signal can be constructed, even prior to the data payload itself being properly decoded, for further analysis.

Further, at this point, a signal definition for an undecoded data signal may be at least partially completed. Taking an example from FIG. 7A, the payload identification data 764 of the signal definition for "ProprietaryEngineRPM" may be determined to include "SB:24" (starting bit: 24), "BL:16" (bit length 16), and "BO:LSB" (bit order: least significant bit) by the results of one of these techniques. The remaining data types for the signal definition may be determined in other steps of the method 700.

Returning to FIG. 7B, at operation 706, the asset data analysis system 300 matches the undecoded data signal to a reference signal with a known signal definition. In other words, the asset data analysis system 300 attempts to match the undecoded data messages to a data message type for which there is an existing signal definition that indicates how a data message having a format of that data message type is to be decoded into asset information. The asset data analysis system 300 may store reference signals linked to known signal definitions for this purpose (e.g., in the data message repository 330 or in a dedicated reference signal library, linked to the ATF library 328).

Figure 9A:
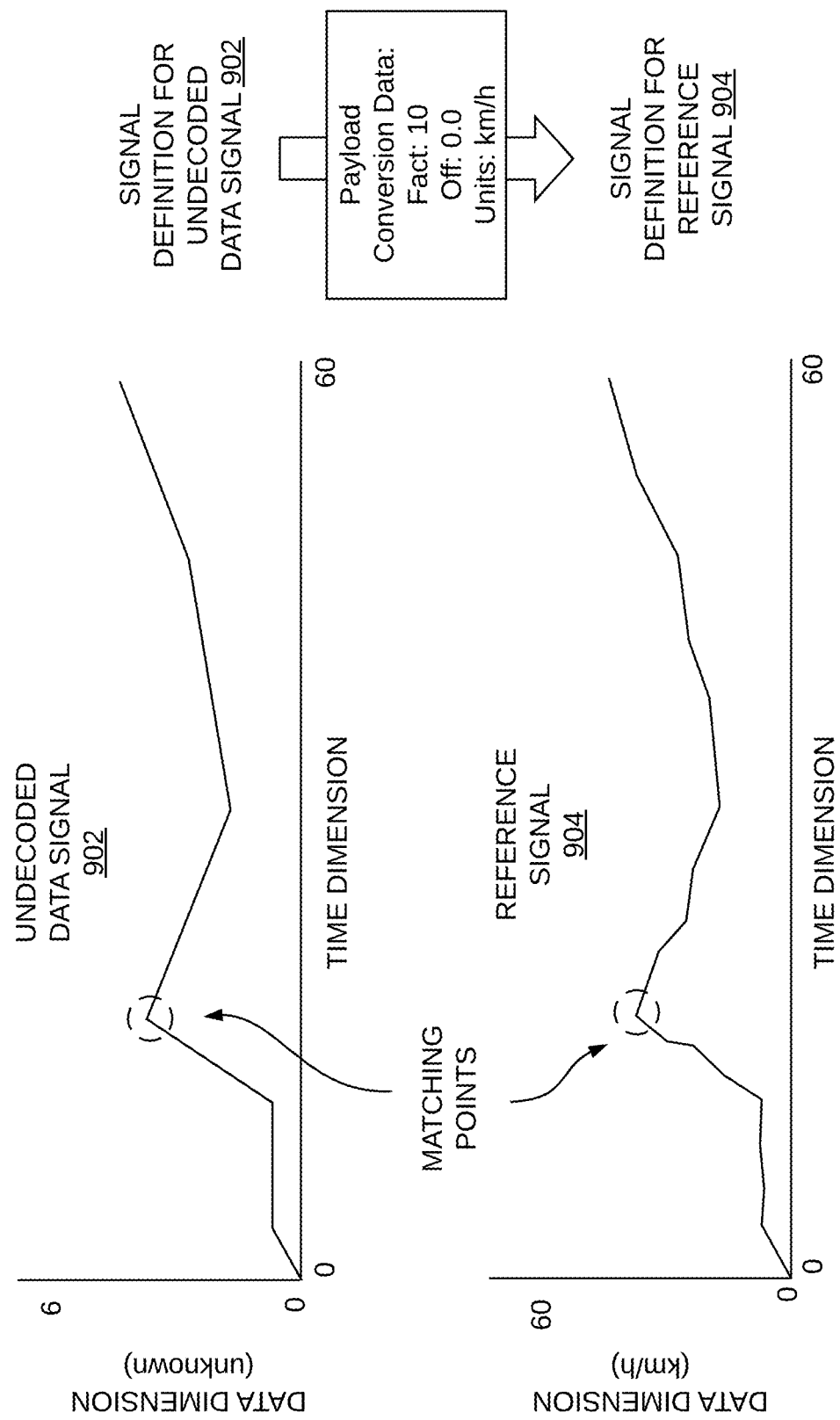
FIG. 9A is a schematic diagram that illustrates the application of an example technique to match a data signal of an unknown data type to a reference signal of a known data type.

In some examples, an undecoded data signal may be matched to a reference signal that was constructed from the same (or substantially the same) underlying data as the undecoded data signal. For example, the undecoded data signal may represent vehicle speed as expressed on one CAN bus of the asset 301, and the reference signal may represent vehicle speed as expressed on another CAN bus of the asset 301, captured over the same period of time, but expressed according to a different set of instructions in payload conversion data (e.g., different data scaling and/or offset factors). In some cases, one data signal may be a broadcasted type, and another data signal may be a requestable type. Initially, the undecoded data signal may be plotted without necessarily knowing the proper scaling, by simply converting the data payloads into decimal values (e.g., converted from binary values). In some examples, the undecoded data signal may be plotted using a default set of characteristics, which may be the formatting characteristics of the reference signal (i.e., initial payload conversion instructions). Next, the undecoded data signal may be scaled and/or offset appropriately until it matches the reference signal with exact or near-exact overlap. For example, as shown in FIG. 9A, an undecoded data signal 902 is shown plotted side by side with a reference signal 904 that was constructed from the same underlying data. However, as can be seen, the undecoded data signal 902 and reference signal 904 differ in data collection rate and data scaling factor. In the present example, the data dimension of the undecoded data signal 902 may be scaled up until one or more points of the undecoded data signal 902 are matched to one or more corresponding points of the reference signal 904, while accounting for differences in data collection rate. Once matched, which occurs when the undecoded data signal 902 is scaled and/or offset appropriately, the scaling and/or offset factors that were used to achieve the match may be used in the generation of a signal definition for undecoded data signal 902 (i.e., operation 708). In the present example, the conversion factor that was initially used to plot the data dimension of the undecoded data signal 902 should be multiplied by a factor of about 10 to match the units of the reference signal 904. Thus, the payload conversion data (e.g., payload conversation data 766 of FIG. 7A) of the signal definition for the undecoded data signal 902 may be determined to include "Fact: 10", "Offset: 0.0", and "Units: km/h", meaning that the decimal value derived from the binary code should be multiplied by a factor of ten, with zero offset applied, to be converted into units of km/h.

In other examples, an undecoded data signal may be matched to a reference signal that was constructed from a different set of underlying data as the undecoded data signal, but that is of the same data type. For example, the reference signal may represent vehicle speed of the asset 301, and the undecoded data signal may represent vehicle speed of another asset, captured over a different period of time, and possibly expressed according to a different signal definition (e.g., different data scaling and/or offset factors). In such cases, although an exact match of one or more points in the undecoded data signal and the reference data signal would not be an appropriate technique for signal matching or determining formatting characteristics, the undecoded data signal may still be matched to a reference signal of the same data type by the application of one or more signal matching heuristics, or by the application of a machine learning model that matches common signal characteristics identified in the two signals. An example of a signal matching heuristic may include, for example, whether the two signals are monotonically increasing or decreasing, whether the two signals start and/or end at zero, or the identification of other signal features in common among the two signals.

Figure 9B:
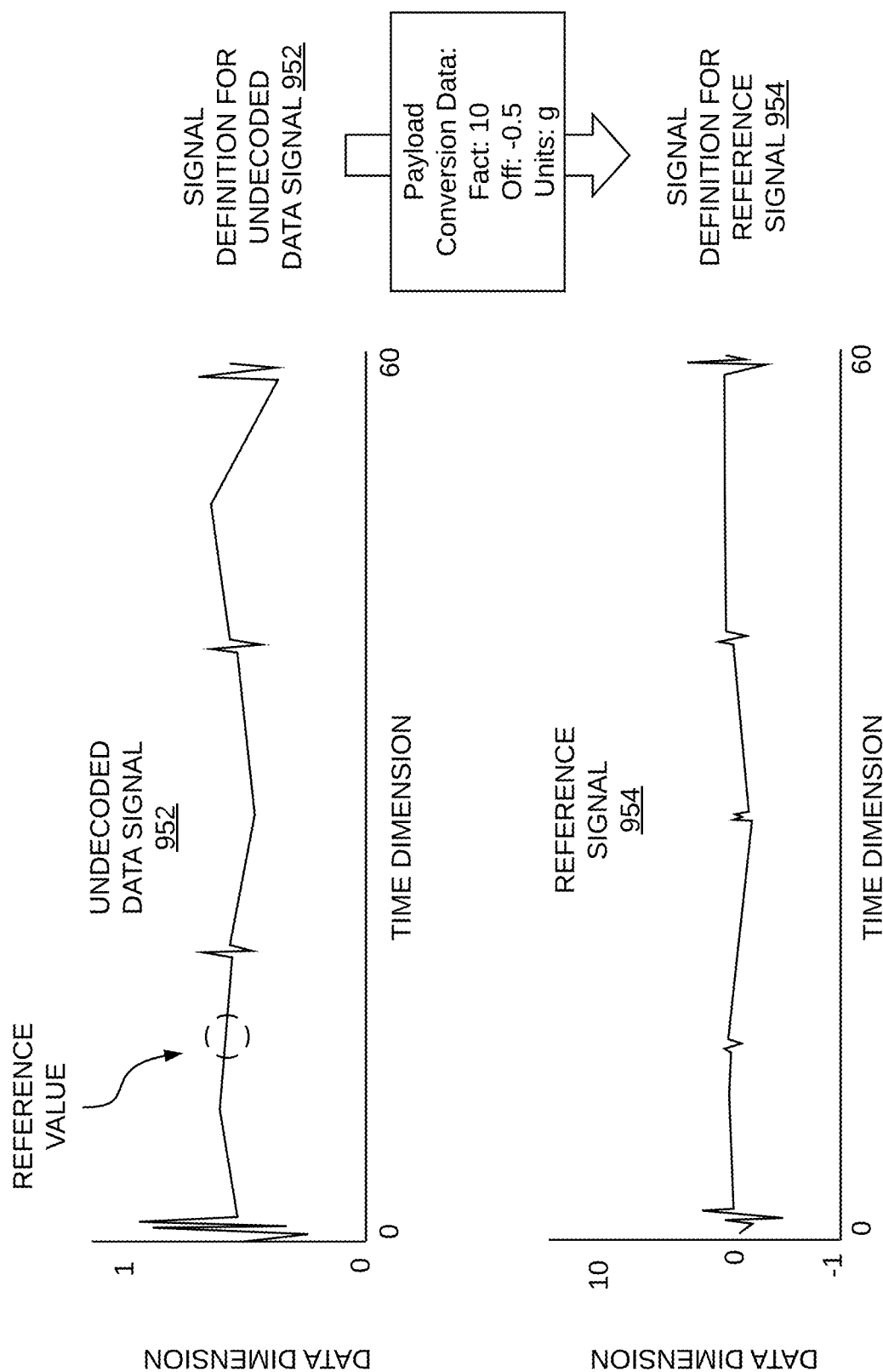
FIG. 9B is a schematic diagram that illustrates the application of another example technique to match a data signal of an unknown data type to a reference signal of a known data type.

An example of an undecoded data signal being matched to a known reference signal constructed from a different underlying set of data is shown in FIG. 9B, in which an undecoded data signal 952 is shown plotted side by side with a reference signal 954 of the same data type. Although based on different underlying datasets, the two signals may be matched together by the application of certain signal matching heuristics and/or signal matching algorithms (e.g., machine learning). In the case of matching based on signal matching heuristics, for example, it may be determined that each of the signals tend to oscillate around a stable value (about 0.5 in the case of the undecoded data signal 952 and about 0 in the case of the reference signal 954), are neither monotonically increasing nor monotonically decreasing, nor tend to have long periods of increasing or decreasing, and are characterized by small perturbations throughout the duration of the signal divided by long stretches of relative inactivity. In the case of matching based on a signal matching algorithm, the two signals may be matched together by the application of a machine learning model that is trained to recognize data signals that contain similar signal features as the reference signal 954 (i.e., corresponding signal features). Thus, the two data signals may be matched as pertaining to the same data type. In the present example, each data signal may be determined to represent an accelerometer reading in the z-direction, typically measured in units of g.

Once determined to be matched to a reference signal constructed from different underlying data, the payload conversion data for the signal definition of the undecoded data signal 952 may be determined with reference to a known reference value that is included in the underlying data of the undecoded data signal 952. That is, the undecoded data signal 952 may be scaled up (and/or offset) until the undecoded data signal 952 overlaps, at a particular point in time, with this reference data point, which is known to be an accurate representation of the real-world value of the undecoded data signal 952 at that point in time. This reference value may be obtained by a sensor, diagnostic tool, and/or asset tracking system located at the asset (e.g., see FIG. 13). For example, a known reference value collected at the asset 301 may indicate, in FIG. 9B, that the asset 301 is known to have experienced a z-accelerometer value of 0.1 g at a particular point in time. The undecoded data signal 952 may be scaled up and/or offset until the undecoded data signal 952 lines up with this reference point. As in the technique above, the adjustments required to match the undecoded data signal 952 to the reference value may be used to determine the payload conversion data for the undecoded data signal 952 (i.e., operation 708). In the present case, the undecoded data signal 952 should be scaled by a factor of 10, and shifted downward by a value of 0.5, and was matched with a data type that is expressed in units of g. Thus, the payload conversion data may be determined to include "Fact: 10", "Offset: −0.5", and "Units: g", meaning that the decimal value derived from the binary code should be multiplied by a factor of ten, with −0.05 offset applied, to be converted into units of g. To account for both scale and offset, it is preferred that at least two reference values are used.

Advantageously, such reference values may have been captured without the prior knowledge that these reference values would be used to determine the payload conversion instructions for the undecoded data signal 952. For example, these reference values may have been captured during the course of data collection at the asset 301 (e.g., by a sensor, asset tracking system, and/or diagnostic tool), and only subsequently selected as a reference value upon determination of the data type of the undecoded data signal 952 (i.e., upon signal matching to the reference signal 954).

Although FIG. 9A and FIG. 9B show plots that illustrate the matching together of two data signals, it is to be understood that the plotting of the two signals is not strictly necessary, as the mathematical analyses described herein may be performed directly on the underlying data of the two signals. Further, the techniques described herein may be performed on the entirety of the undecoded data signal identified in operation 704, or only a portion thereof, which may be made in comparison to the entirety of a reference signal, or any portion thereof. For example, one of the data signals may correspond to an entire trip travelled by a vehicle (or other asset), or only a portion thereof.

Returning to FIG. 7B, at operation 708, following the matching of an undecoded data signal to a reference signal, the asset data analysis system 300 determines the payload conversion data (i.e., formatting characteristics) of a new signal definition that would define how the undecoded data signal is to be decoded into asset information. As described above with reference to FIG. 9A and FIG. 9B, the payload conversion data for the signal definition for the undecoded data signal may be derived directly from the adjustments to the undecoded data signal that were necessary to scale/offset (i.e., match) the undecoded data signal to the reference signal and/or reference values, where applicable.

At operation 710, the signal definition for the undecoded data signal is recorded. That is, the message protocol data (i.e., determined at operation 702), the payload identification data (i.e., determined at operation 704), and the payload conversion data (i.e., determined at operation 706/708), are recorded, given a label, added to the signal definition library 326, and linked to the asset type fingerprint of the asset 301 for use by the asset tracking system 302 to obtain the outstanding asset information from the asset 301.

Figure 10:
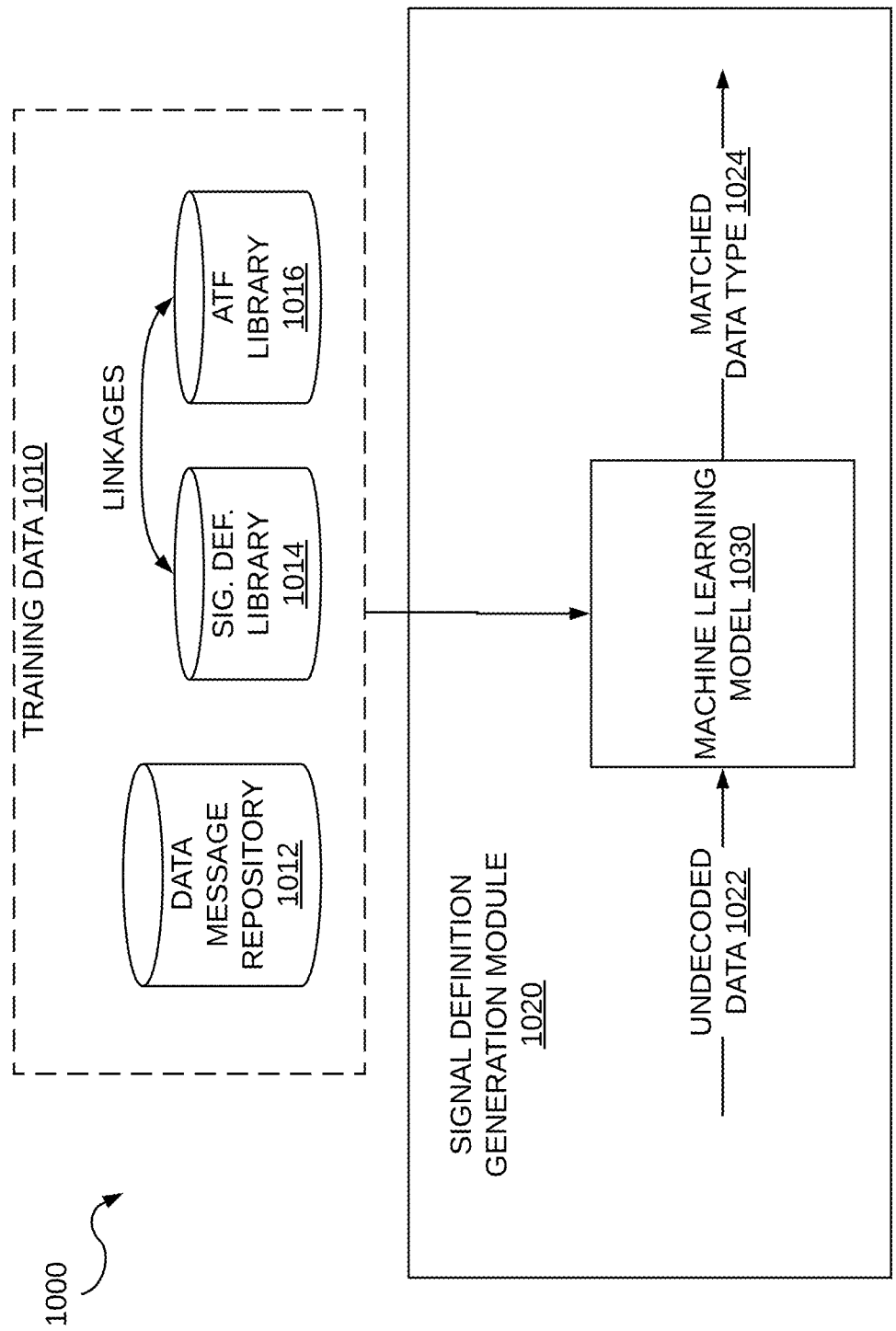
FIG. 10 is a schematic diagram of an example system for matching a data signal of an unknown data type to a reference signal of a known data type using a machine learning model.

FIG. 10 is a schematic diagram of an example system 1000 to match an undecoded data signal of an unknown data type to a reference signal of a known data type using machine learning. The system 1000 may be applied at operation 706 of the method 700, above, to match an undecoded data signal to a known reference signal. Thus, the system 1000 may be maintained and operated by, for example, the asset data analysis system 300 of FIG. 3.

The system 1000 includes training data 1010, which includes a data message repository 1012, a library of signal definitions 1014, and a library of asset type fingerprints 1016 (which may be similar to the data message repository 330, library of signal definitions 326, and asset type fingerprint library 328, of FIG. 3), a signal definition generation module 1020 (which may be similar to the signal definition generation module 324 of FIG. 3), and a machine learning model 1030.

The machine learning model 1030 is trained on the training data to recognize data types from data messages of unknown data types based on signal characteristics. That is, the machine learning model 1030 is trained to match data signals of unknown data types, such as the undecoded data signal 902 of FIG. 9, to reference signals of known data types, such as the reference signal 904 of FIG. 9. The machine learning model 1030 may be trained to detect common signal characteristics, such as, for example, monotonically increasing or decreasing, periods of increasing or decreasing, oscillation about a midline, or other signal characteristics that data types are expected to exhibit in similar ways across different asset types.

The signal definition generation module 1020 may feed undecoded data 1022 to the machine learning model 1030 (i.e., containing an undecoded data signal), and the machine learning model may be applied to the undecoded data 1022 to match the undecoded data 1022 to a matched data type 1024 for which there is an existing signal definition. In other words, the machine learning model 1030 may be trained to recognize signal features in data signals constructed from data messages of unknown data types that indicate the data type of those data messages. For example, the machine learning model 1030 may be trained on a training dataset that includes engine speed, GPS speed, accelerometer, odometer, and other data types, and this machine learning model 1030 may be applied to determine that the undecoded data 1022 represents, for example, GPS speed. In other examples, the signal definition generation module 1020 may include a plurality of machine learning models 1030, each trained to recognize a different data type, and the signal definition generation module 1020 may apply each of these machine learning models to the undecoded data signal 1022, and select the machine learning model that produces the highest degree of match as having recognized the correct data type.

Figure 11:
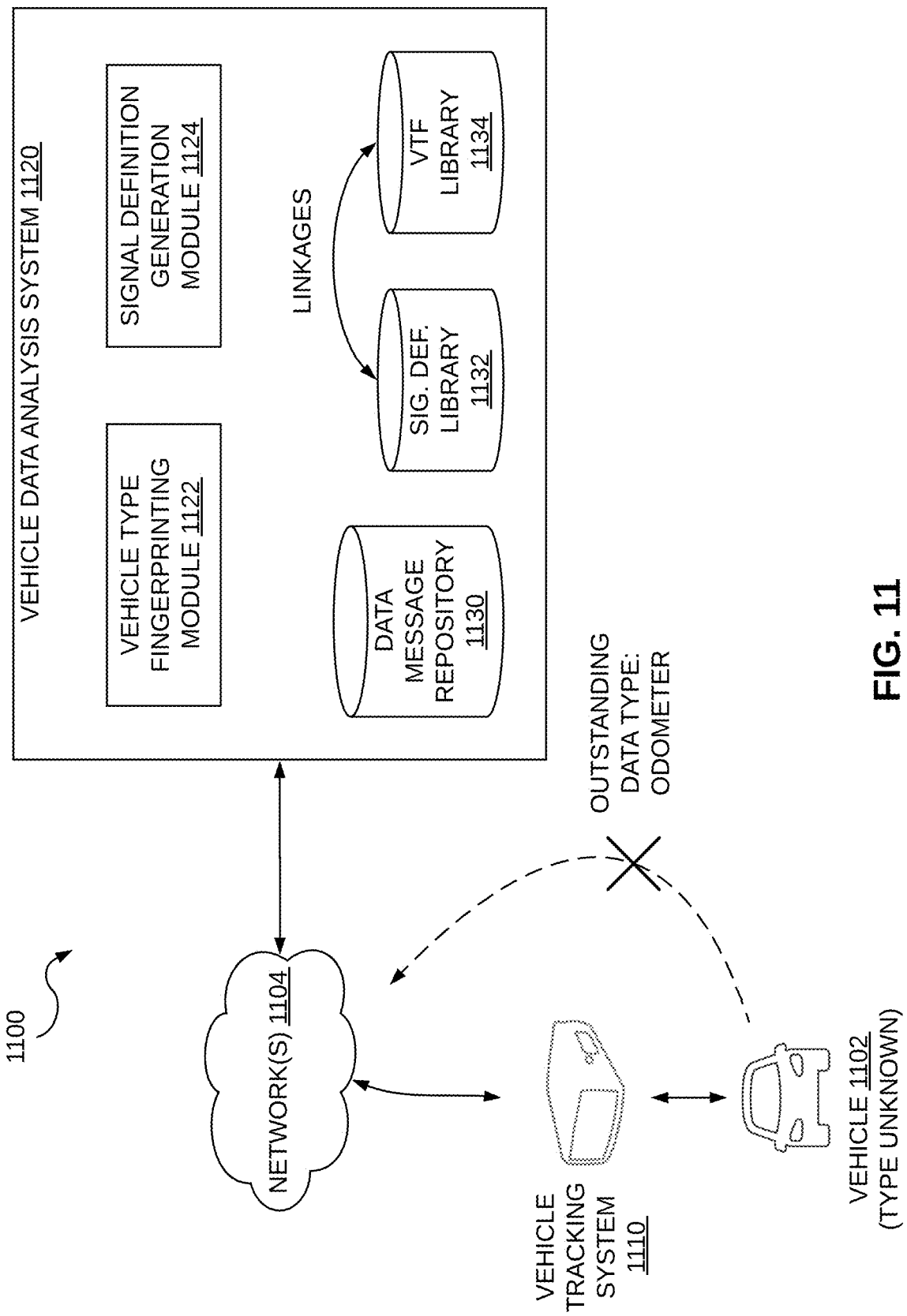
FIG. 11 is a schematic diagram of an example system for determining a vehicle type fingerprint for a vehicle and generating a signal definition to decode data collected from the vehicle.

FIG. 11 is a schematic diagram of an example system 1100 for determining a vehicle type fingerprint for a vehicle and generating a signal definition to decode data collected from the vehicle. The system 1100 may be understood as a specific use case of the system 100 of FIG. 1, where the asset 102 is a vehicle and the asset tracking system 110 is a vehicle tracking system. Thus, the system 1100 includes a vehicle 1102 and a vehicle tracking system 1110 that communicates with a vehicle data analysis system 1120 via one or more network(s) 1104. The vehicle data analysis system 1120 includes a vehicle type fingerprinting module 1122, a signal definition generation module 1124, a data message repository 1130, a signal definition library 1132, and a vehicle type fingerprint library 1134. These elements of the system 1100 may be structured and may operate in ways that are similar to the manner described with reference to the elements of the system 100 in FIG. 1. Thus, for further information about the elements of the system 1100, the description of the system 100 may be referenced. Further, a greater appreciation of the structure and function of the elements of the system 100 of FIG. 1 may be attained with reference to the specific use case described in FIG. 11.

In the present example, the vehicle tracking system 1110 is initially unable to identify the vehicle type of the vehicle 1102. In addition, the vehicle tracking system 1110 is unable to obtain the odometer data type from the vehicle 1102 (i.e., odometer is an outstanding data type). These issues may be resolved upon application of the method 1200 of FIG. 12.

Figure 12:
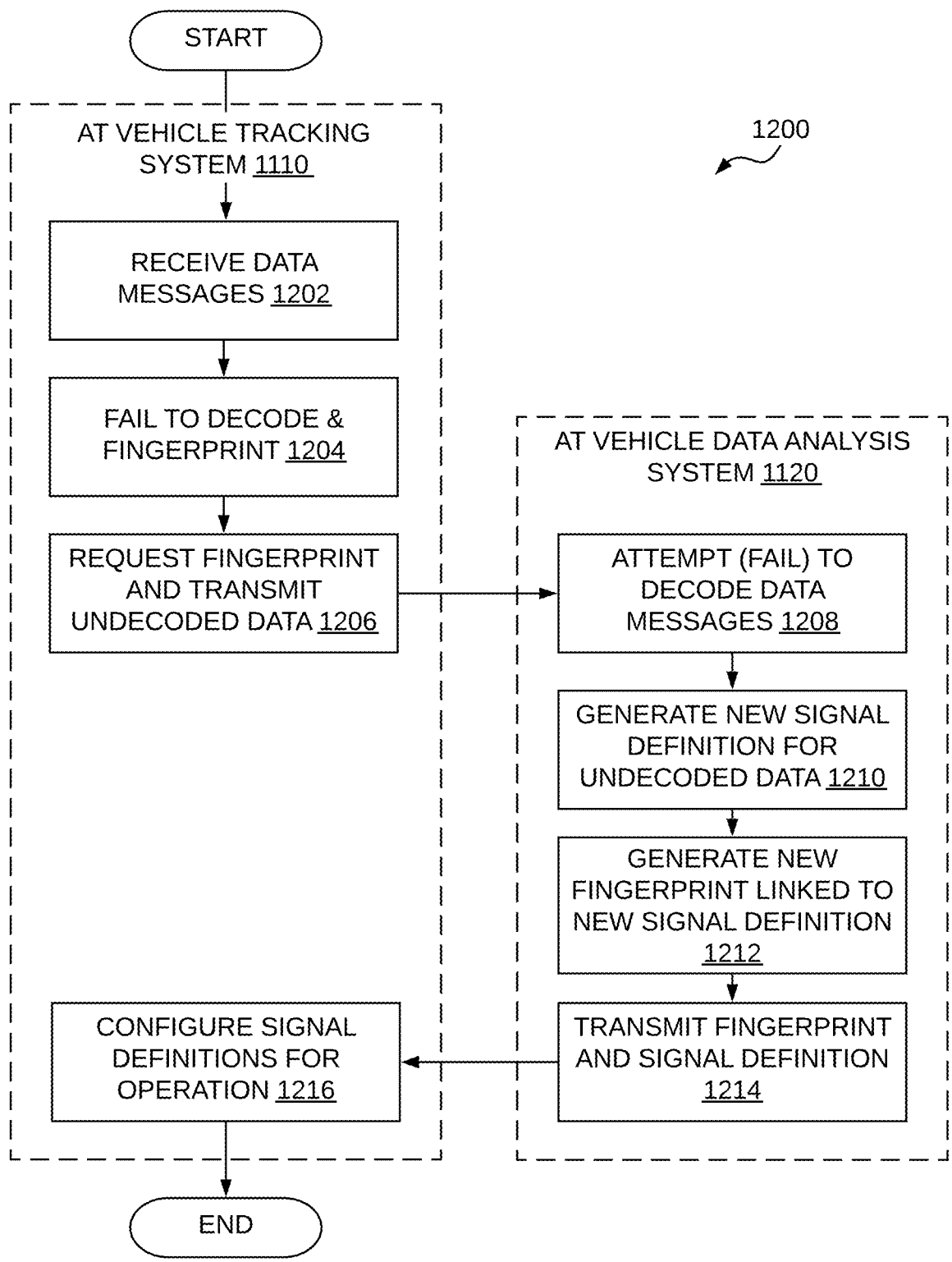
FIG. 12 is a flowchart of an example method for determining a vehicle type fingerprint for a vehicle and generating a signal definition to decode data collected from the vehicle.

FIG. 12 is a flowchart of an example method 1200 for determining a vehicle type fingerprint for a vehicle and generating a signal definition to decode data collected from the vehicle. For illustrative purposes, the method 1200 will be described with reference to the system 1100 of FIG. 11, and with reference to proposing a vehicle type fingerprint for the vehicle 1102 and obtaining odometer signals from the vehicle 1102, but it is to be understood that the method 1200 may be applied to other systems.

At operation 1202, the vehicle tracking system 1110 receives data messages (e.g., CAN messages) from the vehicle 1102. As described above, in cases where the vehicle tracking system 1110 is a device coupled to the vehicle 1102 through a communication port, the data messages may be received via this communication port (e.g., OBD2 port or J1939 port). In cases where the vehicle tracking system 1110 is integrated into the vehicle 1102, the data messages may be received directly (e.g., directly from an ECU of the vehicle 1102 or over a CAN). Some of the data messages may be data messages that the vehicle tracking system 1110 is able to obtain by request in accordance with a startup procedure in which the vehicle tracking system 1110 listens for broadcast messages from the vehicle 1102 and/or tests the vehicle 1102 with various requests, if safe to do so without knowing the vehicle type of the vehicle 1102.

At operation 1204, the vehicle tracking system 1110 attempts, and fails, to identify/fingerprint the vehicle 1102. Further, failing to identify/fingerprint the vehicle 1102 may be at least partly a result of failing to obtain and/or decode one or more outstanding data messages (e.g., odometer, VIN, fuel level), that may be useful to identify the vehicle 1102, and in any event, may be desired from the vehicle 1102.

At operation 1206, the vehicle tracking system 1110 requests fingerprint identification from the vehicle data analysis system 1120, and where applicable, provides access (e.g., transmits or opens a channel to provide access) to data messages obtained from the vehicle 1102, including, where applicable, undecoded data messages. In this example, some of the data messages provided to the vehicle data analysis system 1120 are undecoded data messages that correspond to an outstanding data type.

At operation 1208, the vehicle data analysis system 1120 attempts, and fails, to decode the set of undecoded data messages from the vehicle 1102, with reference to its signal definition library 1132.

At operation 1210, the vehicle data analysis system 1120 generates a new signal definition for the undecoded data messages. That is, the vehicle data analysis system 1120 generates a signal definition that indicates how the outstanding data messages are to be decoded into vehicle information. This operation may involve matching a data signal derived from the undecoded data messages to a reference signal for which there is a known signal definition and determining conversion payload instructions for the signal definition based on one or more matching points in the reference signal and/or one or more matching reference values. Further details of techniques applicable to this operation are described elsewhere in this disclosure (e.g., FIG. 7B).

At operation 1212, the vehicle data analysis system 1120 generates a new vehicle type fingerprint that uniquely identifies the vehicle type of the vehicle 1102 apart from known vehicle types for which there are vehicle type fingerprints stored in the VTF library 1134. In the present example, the new vehicle type fingerprint includes the criteria that the undecoded data messages can be decoded using the newly generated signal definition. Further details of techniques applicable to this operation are described in greater elsewhere in this disclosure (e.g., FIG. 5B). The vehicle data analysis system 1120 also adds the newly generated vehicle type fingerprint to the VTF library 1134, adds the newly generated signal definition to the library of signal definitions 1132, and links the newly generated/proposed vehicle type fingerprint to the new signal definition.

At operation 1214, the vehicle data analysis system 1120 transmits the new vehicle type fingerprint and new signal definition to the vehicle tracking system 1110 for its use.

At operation 1216, the vehicle tracking system 1110 acknowledges the new vehicle type fingerprint and configures itself to obtain vehicle information from the vehicle 1102 accordingly. This includes adding the new signal definition to its local set of signal definitions, and configuring itself to reference any additional signal definitions linked to the proposed vehicle type fingerprint.

Variations to the system 1100 and the method 1200 (and indeed the more generalized system 100 of FIG. 1 and related methods) are contemplated. For example, in other embodiments, certain functionality described as being performed by the vehicle data analysis system 1120 may be performed by the vehicle tracking system 1110 (to the extent permitted by processing and/or memory capabilities of the vehicle tracking system 1110), and vice versa. For example, the vehicle tracking system 1110, with sufficient processing and memory capabilities, may perform the vehicle type fingerprint generation techniques described as being performed by the vehicle type fingerprinting module 1122, and/or may perform the signal definition generation techniques described as being performed by the signal definition generation module 1124. And more generally, the asset tracking system 110 of FIG. 1 may perform the asset type fingerprint generation techniques described as being performed by the asset type fingerprinting module 122, and/or may perform the signal definition generation techniques described as being performed by the signal definition generation module 124. Thus, while there may be certain efficiencies and other benefits gained by performing fingerprint generation and signal definition generation at a remote system (e.g., access to greater sources of data, access to data collected at other assets, computational efficiencies, greater memory storage), these processes may be performed entirely at a local system (e.g., asset tracking system 110), entirely at a remote system (e.g., asset data analysis system 120), or distributed arbitrarily between local and remote systems.

Figure 13:
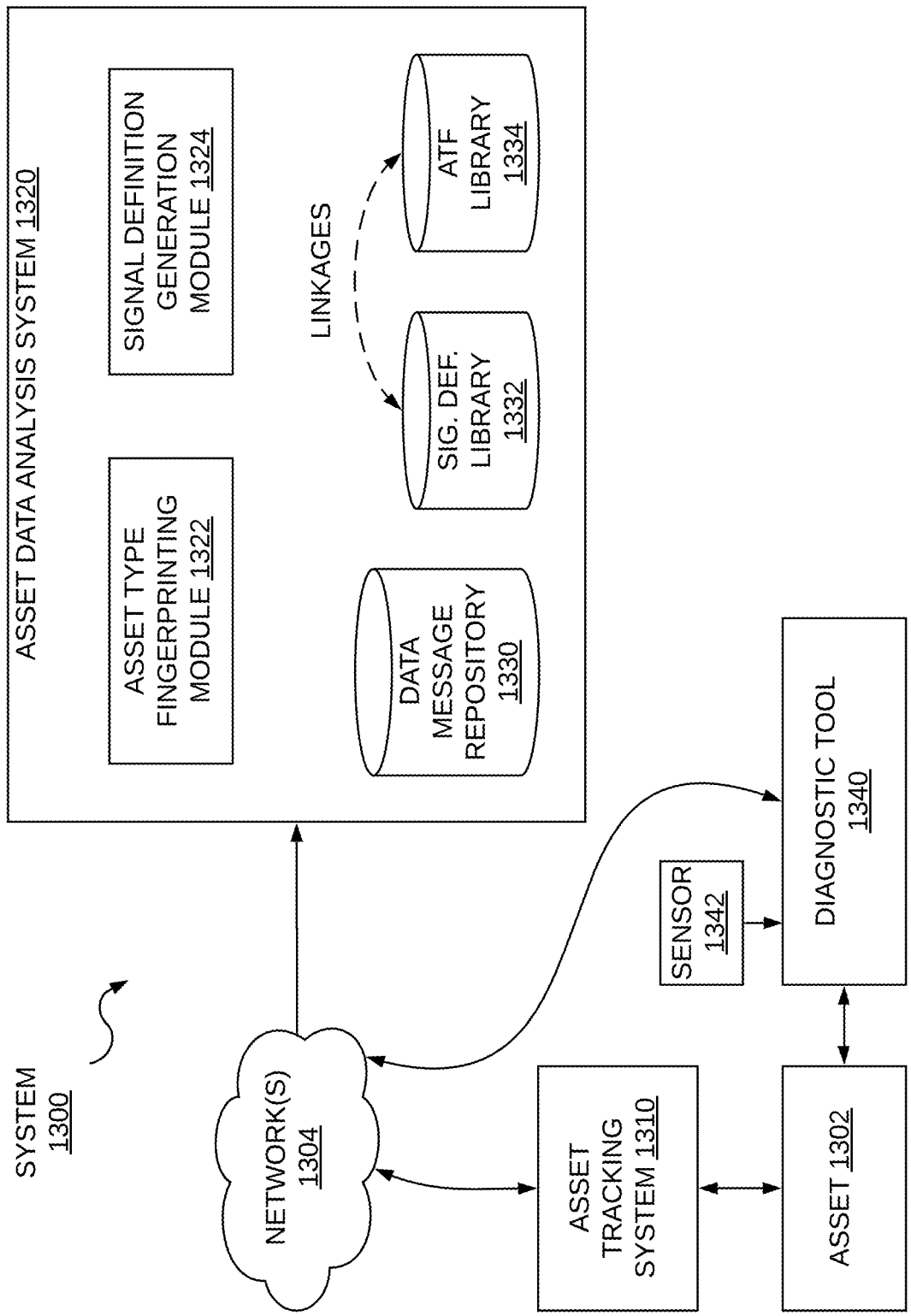
FIG. 13 is a schematic diagram of an example system for determining an asset type fingerprint of an asset and generating a signal definition to decode data collected from the asset, wherein the system includes a diagnostic tool located at the asset.

FIG. 13 is a schematic diagram of an example system 1300 for determining an asset type fingerprint of an asset and generating a signal definition to decode data collected from the asset, wherein the system includes a diagnostic tool located at the asset. The system 1300 may be similar to the system 100 of FIG. 1, but with elements numbered in the "1300" series rather than the "100" series, and therefore includes an asset 1302, asset tracking system 1310, network(s) 1304, asset data analysis system 1320, asset type fingerprinting module 1322, signal definition generation module 1324, data message repository 1330, signal definition library 1332, and asset type fingerprint library 1334. For further description of these components, description of the system 100 of FIG. 1 may be referenced.

In addition, the system 1300 further includes a diagnostic tool 1340 located at the asset 1302. The diagnostic tool 1340 may communicate with the asset 1302 directly (e.g., through a communication port such as an OBD2 port), similar to how the asset tracking system 1310 communicates with the asset 1302 directly. The diagnostic tool 1340 may be used to attempt to identify an asset type fingerprint of the asset 1302 and to generate signal definitions to decode data messages received from the asset 1302, similar to the asset data analysis system 1320. In other words, certain aspects of the functionality of the asset data analysis system 1320 (e.g., asset type fingerprinting, signal definition generation) may be embodied in the diagnostic tool 1340.

In some examples, the diagnostic tool 1340 may provide such functionality, at least in part, in communication with the asset data analysis system 1320 through the network(s) 1304, circumventing the need for an asset tracking system 1310 for such tasks. In such examples, the diagnostic tool 1340 may be used to perform fingerprinting and decoding tasks on assets that may not yet be equipped with asset tracking systems, e.g., for example, to prepare asset type fingerprints and signal definitions for a later installation of an asset tracking system 1310.

The diagnostic tool 1340 may include a compact mobile device capable of operating on-site at an asset 1302, such as, for example, a laptop computer, tablet, mobile device, or other mobile computing device. In some examples, the diagnostic tool 1340 may be capable of providing certain functions of the asset data analysis system 1320, albeit limited to its local resources, without the need for a network connection via network(s) 1304 to the asset data analysis system 1320. In other words, the diagnostic tool 1340 may operate a local version of an asset type fingerprinting module, signal definition generation module, data message repository, signal definition library, and asset type fingerprint library.

In addition to the functionality similar to the asset data analysis system 1320, the diagnostic tool 1340 may include one or more sensors 1342 to gather sensor data to detect a property, state, or operating condition of the asset 1302, or other information that may be pertinent to the processes of asset type fingerprinting and/or signal definition generation.

For example, the sensor 1342 may include an accelerometer that records motion at the asset 1302. The diagnostic tool 1340 may correlate or cross-reference its accelerometer readings with data messages received from the asset 1302 and search for a data signal that matches the accelerometer readings (e.g., as described herein, via reference signal matching, machine learning, or another technique that involves a comparison of signal characteristics). Time stamps of the data messages may be matched with time stamps of the accelerometer readings, and the two sources of data may be compared to identify data signals that are correlated. Thus, the diagnostic tool 1340 may determine candidates for data messages that are likely to represent accelerometer readings (e.g., see operation 706 of FIG. 7B). Further, the readings obtained from the diagnostic tool 1340 may be used as one or more reference values to enable the determination of the conversion payload instructions for the signal definition of an undecoded data signal (e.g., see operation 706/708 of FIG. 7B).

In another example, the sensor 1342 may include a camera pointed toward the dashboard, heads-up display, or other information display of the asset 1302. The camera may capture images of information displayed on that dashboard, heads-up display, or other information display, that convey asset information, such as, for example, turn signal, odometer reading, fuel gauge, tachometer, speedometer, seatbelt status, other instrumentation displays, or other sources of asset information. In some examples, these images may be processed by the diagnostic tool 1340 (or by another system, such as the asset data analysis system 1320, routed through the diagnostic tool 1340) via machine vision techniques to read the asset information contained therein. As in the case of the accelerometer, the diagnostic tool 1340 may correlate or cross-reference this information with data messages received from the asset 1302 and search for a data signal that matches the information obtained by the camera (e.g., via reference signal matching, machine learning, or another technique that involves a comparison of signal characteristics). Similarly, time stamps of the data messages may be matched with time stamps of the captured images, and the two sources of data may be compared to identify data signals that are correlated. Thus, the diagnostic tool 1340, in cooperation with its camera (or other sensor 1342), may determine candidates for data messages that are likely to represent any reading available on a vehicle dashboard (e.g, odometer) for signal matching purposes (e.g., see operation 706 of FIG. 7B). Further, the readings obtained from the diagnostic tool 1340, in cooperation with its camera, may be used as one or more reference values to enable the determination of the conversion payload instructions for the signal definition of an undecoded data signal (e.g., see operation 706/708 of FIG. 7B).

Another example of the sensor 1342 may include a GPS module to record GPS position and/or GPS speed, any of which may be used as reference values in the techniques described above.

In still other examples, the diagnostic tool 1340 need not be a separate device, but may be incorporated into the asset tracking system 1310. That is, the asset tracking system 1310 may include functionality to perform asset type fingerprinting and signal definition generation, as described herein, with the assistance of a direct connection to one or more sensors to detect a property, state, or operating condition of the asset 1302, or other information that may be pertinent to the processes of asset type fingerprinting and/or signal definition generation. Thus, in operation, an asset tracking system 1310 may be initially fitted with a sensor (e.g., accelerometer, camera) as the asset tracking system 1310 undergoes a startup phase in which it attempts to fingerprint and/or decode data messages received from the asset 1302, and, in cooperation with the diagnostic tool 1340 and/or asset data analysis system 1320, develops a sufficient set of signal definitions to decode the necessary information from the asset 1302 (e.g., via assistance with signal matching and/or determining payload conversion instruction).

In still other examples, the diagnostic tool 1340 may be considered to be part of the asset data analysis system 1320. Thus, it may be considered that the asset data analysis system 1320 includes the sensor 1342 to assist in its asset type fingerprinting and signal definition generation operations.

Any of these above techniques involving sensor detection may be applied to identify data messages that are of the broadcasted type. However, any of these above techniques involving sensor detection may also be applied to identify data messages that are of the requested type. In such cases, the diagnostic tool 1340 may make information requests at the same time, or about the same time, as the sensor 1342 reads sensor data, to the asset 1302 (i.e., to one or more ECUs thereof). The diagnostic tool 1340 may store a list of common request addresses where assets are known to respond to requests for information of the relevant type. For example, when investigating accelerometer, the diagnostic tool 1340 may make requests at common request addresses that can be expected to respond with accelerometer information. The diagnostic tool 1340 may attempt several different addresses to attain such information of the asset 1302 until an address responds back with data messages that appear to correlate with the information obtained by the sensor 1342.

Thus, methods and systems for determining asset type fingerprints of assets and for generating signal definitions to obtain asset information from assets are provided. These systems and methods may be applied to vehicle telematics to enable the identification of, and collection of information from, vehicles which deviate from standardized communication protocols. These techniques may enable a large and growing fleet of assets consisting of a multitude of different asset types to be tracked using the same type of asset tracking system for each asset, with each asset tracking system being individually self-configured to collect information from the particular asset type to which it is assigned using a specifically defined set of signal definitions. These asset tracking systems may automatically determine the type of asset that it is assigned to track and assemble the necessary signal definitions to collect information from that asset type. These asset tracking systems may be updated on an ongoing basis with new signal definitions as they are generated.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method by a telematics device of, comprising:
  receiving, at the telematics device, a plurality of data messages from an asset that is coupled to the telematics device;
  attempting to obtain asset information from the plurality of data messages with reference to a local set of signal definitions maintained at the telematics device, the local set of signal definitions indicating how data messages received from the asset are to be decoded into asset information; and
  upon failing to obtain asset information corresponding to a data message of an outstanding data type from the asset:
    requesting, from an asset data analysis system, a generated signal definition indicating how the data message of the outstanding data type is to be obtained from the asset;
    providing access to at least one undecoded data message of the outstanding data type to the asset data analysis system;
    receiving the generated signal definition from the asset data analysis system; and
    adding the generated signal definition to the local set of signal definitions maintained at the telematics device.

2. The method of claim 1, wherein the outstanding data type is a requestable data type, and the generated signal definition indicates how a data message of the outstanding data type is to be solicited from the asset via a request.

3. The method of claim 2, further comprising storing a list of common request addresses and request formats that are expected to produce responses of the outstanding data type.

4. The method of claim 1, wherein the outstanding data type is a broadcasted data type, and the data message of the outstanding data type is included in the at least one undecoded data message to which an access is provided to the asset data analysis system.

5. The method of claim 1, wherein the asset comprises a vehicle and the data messages comprise Controller Area Network (CAN) messages.

6. The method of claim 1, further comprising obtaining asset information of the outstanding data type from the plurality of data messages by decoding data messages of the plurality of data messages using the generated signal definition in the local set of signal definitions.

7. The method of claim 6, further comprising transmitting the asset information to the asset data analysis system.

8. The method of claim 1, wherein the local set of signal definitions comprises a data structure containing a plurality of signal definitions linked to a plurality of asset types.

9. The method of claim 8, wherein each asset type of the plurality of asset types may be linked to a subset of signal definitions of the plurality of signal definitions.

10. The method of claim 9, wherein each signal definition of the subset of signal definitions may be used to obtain a different data message of an outstanding data type from the asset type linked to the subset of signal definitions.

11. The method of claim 10, wherein each signal definition of the subset of signal definitions contains label data, that labels the respective signal definition.

12. The method of claim 10, wherein each signal definition of the subset of signal definitions contains message protocol data that defines a messaging protocol to solicit and receive a data message of the plurality of data messages.

13. The method of claim 12, wherein the message protocol data comprises a request code and a response code.

14. The method of claim 10, wherein each signal definition of the subset of signal definitions contains payload identification data that defines how a payload is to be found in a data message of the plurality of data messages.

15. The method of claim 14, wherein the payload identification data comprises an offset and a length.

16. The method of claim 10, wherein each signal definition of the subset of signal definitions contains payload conversion data that defines how a payload is to be translated into real-world values.

17. The method of claim 16, wherein the payload conversion data comprises a scaling factor.

18. The method of claim 10, wherein each signal definition of the subset of signal definitions defines a request interval that defines how often a request for a data message of an outstanding type may be made to the asset.

19. The method of claim 10, wherein each signal definition of the subset of signal definitions defines a period of time during which it is appropriate to attempt to obtain asset information from the asset.

20. The method of claim 19, wherein the period of time may be based on a status of the asset.

* * * * *